United States Patent
Tanaka et al.

(10) Patent No.: US 10,476,632 B2
(45) Date of Patent: Nov. 12, 2019

(54) DEVICE AND METHOD FOR TRANSMITTING FRAME IN OPTICAL TRANSMISSION SYSTEM

(71) Applicant: FUJITSU LIMITED, Kawasaki-shi, Kanagawa (JP)

(72) Inventors: Toshiki Tanaka, Setagaya (JP); Tomoo Takahara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 230 days.

(21) Appl. No.: 15/640,181

(22) Filed: Jun. 30, 2017

(65) Prior Publication Data
US 2017/0302406 A1    Oct. 19, 2017

Related U.S. Application Data

(63) Continuation of application No. PCT/JP2015/050299, filed on Jan. 7, 2015.

(51) Int. Cl.
*H04L 1/00* (2006.01)
*H04B 10/80* (2013.01)
(Continued)

(52) U.S. Cl.
CPC ............ *H04L 1/0041* (2013.01); *H04B 10/40* (2013.01); *H04B 10/516* (2013.01); *H04B 10/60* (2013.01);
(Continued)

(58) Field of Classification Search
CPC ... H04L 1/0041; H04L 1/0002; H04L 1/0075; H04B 10/40; H04B 10/516; H04B 10/60; H04B 10/801
See application file for complete search history.

(56) References Cited

U.S. PATENT DOCUMENTS 6,848,070 B1 *  1/2005  Kumar .............. H03M 13/6502
                                                714/758
7,869,343 B1 *  1/2011  Xue ...................... H04L 1/0041
                                                370/216
(Continued)

FOREIGN PATENT DOCUMENTS

JP     2003-273840        9/2003
JP     2006-217318        8/2006
WO     2011/145133 A1    11/2011

OTHER PUBLICATIONS

International Search Report dated Feb. 17, 2015 in corresponding International Application No. PCT/JP2015/050299.
(Continued)

*Primary Examiner* — Kyle Vallecillo
(74) *Attorney, Agent, or Firm* — Staas & Halsey LLP

(57) ABSTRACT

A transmission device is implemented in a first node in an optical transmission system in which a frame is transmitted from the first node to a second node via an optical interface. The transmission device includes a decision unit that decides whether a type of a first error correction code used in the first node is the same as a type of a second error correction code used in the second node. When a type of the first error correction code is the same as a type of the second error correction code, the transmission device transmits the frame to which an error correction code used in the first node is added to the second node without terminating the error correction code.

11 Claims, 16 Drawing Sheets

(51) Int. Cl.
H04B 10/60 (2013.01)
H04B 10/516 (2013.01)
H04B 10/40 (2013.01)

(52) U.S. Cl.
CPC ......... *H04B 10/801* (2013.01); *H04L 1/0002* (2013.01); *H04L 1/0075* (2013.01)

(56) References Cited

U.S. PATENT DOCUMENTS

| | | | |
|---|---|---|---|
| 9,191,152 B2* | 11/2015 | Horiguchi | H04L 1/0041 |
| 2003/0188248 A1* | 10/2003 | Kauschke | H03M 13/15 |
| | | | 714/755 |
| 2004/0170201 A1* | 9/2004 | Kubo | H03M 13/2721 |
| | | | 370/535 |
| 2012/0202420 A1* | 8/2012 | Horiguchi | H04L 1/0041 |
| | | | 455/39 |
| 2013/0007553 A1* | 1/2013 | Nishida | H04L 1/0009 |
| | | | 714/752 |
| 2013/0177309 A1 | 7/2013 | El-Ahmadi et al. | |
| 2014/0161456 A1* | 6/2014 | Sugawa | H04J 14/0227 |
| | | | 398/72 |

OTHER PUBLICATIONS

Written Opinion of the International Searching Authority dated Feb. 17, 2015 in corresponding International Application No. PCT/JP2015/050299.
Pete Anslow et al., "A 400GbE Architectural Option", IEEE P802.3bs 400Gb/s Ethernet Task Force, Jul. 2014, San Diego, pp. 1-14.
Office Action dated Apr. 3, 2018, in corresponding Japanese Patent Application No. 2016-568219, 5 pgs.

\* cited by examiner

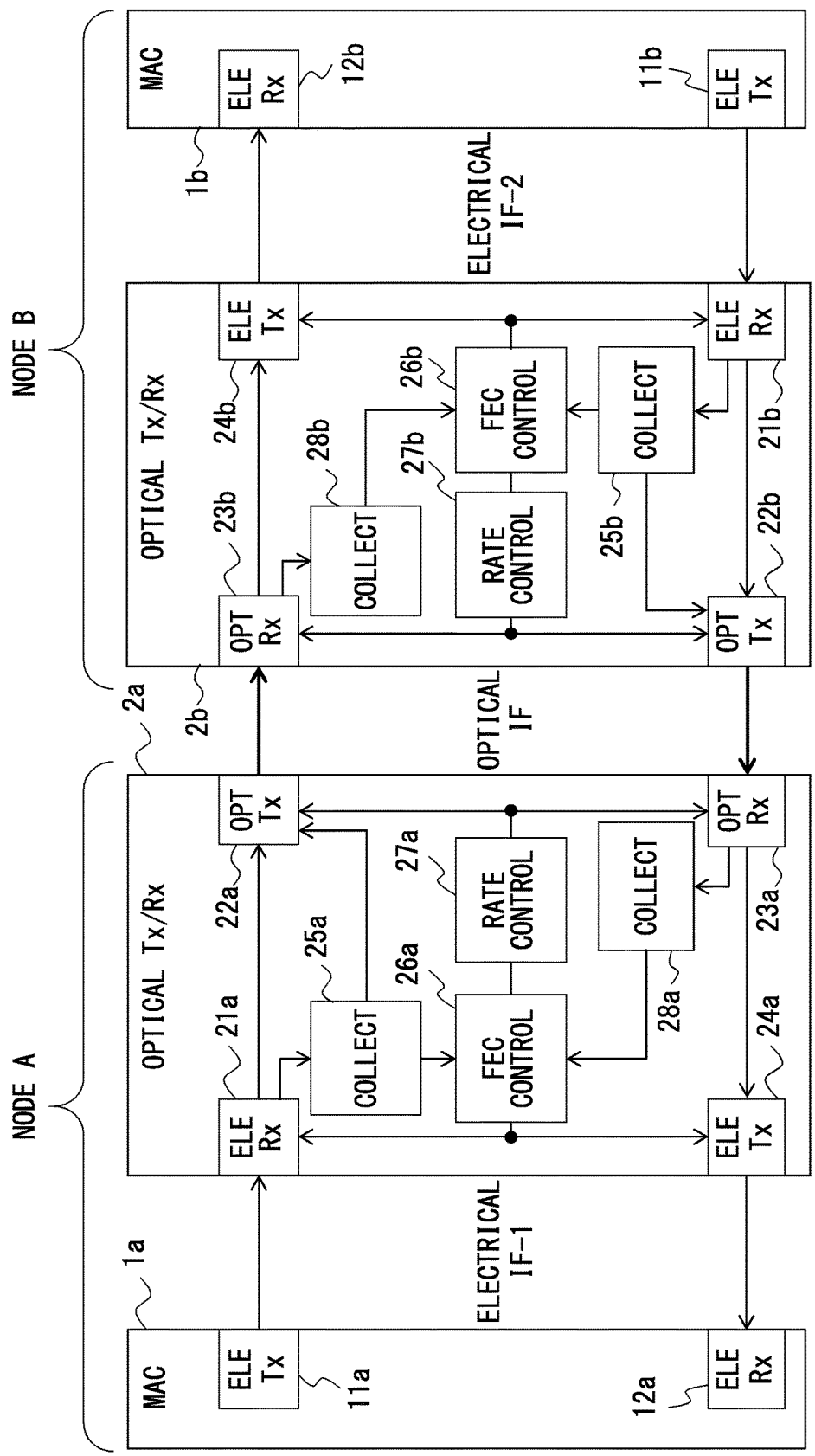
F I G. 3

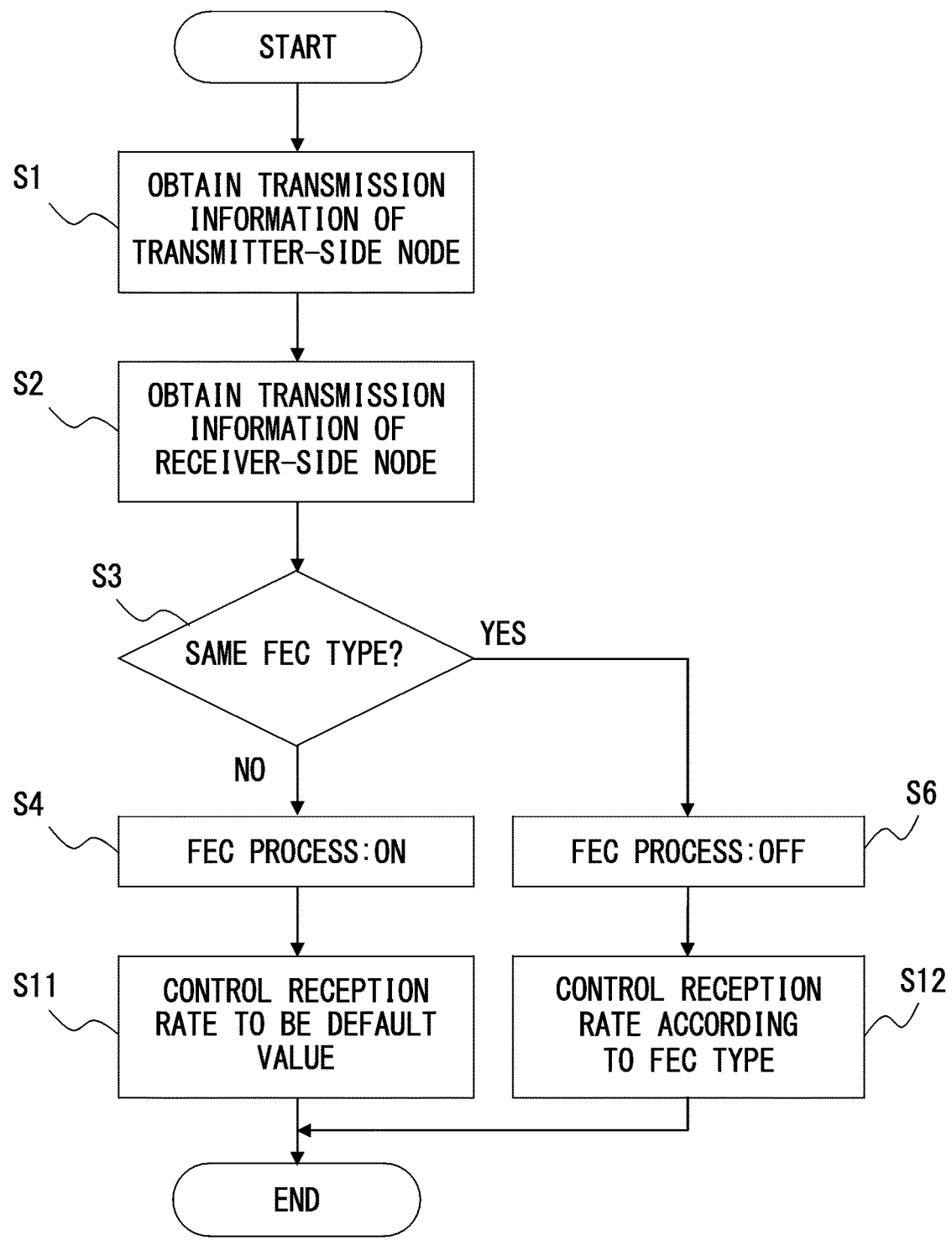
F I G. 7 B

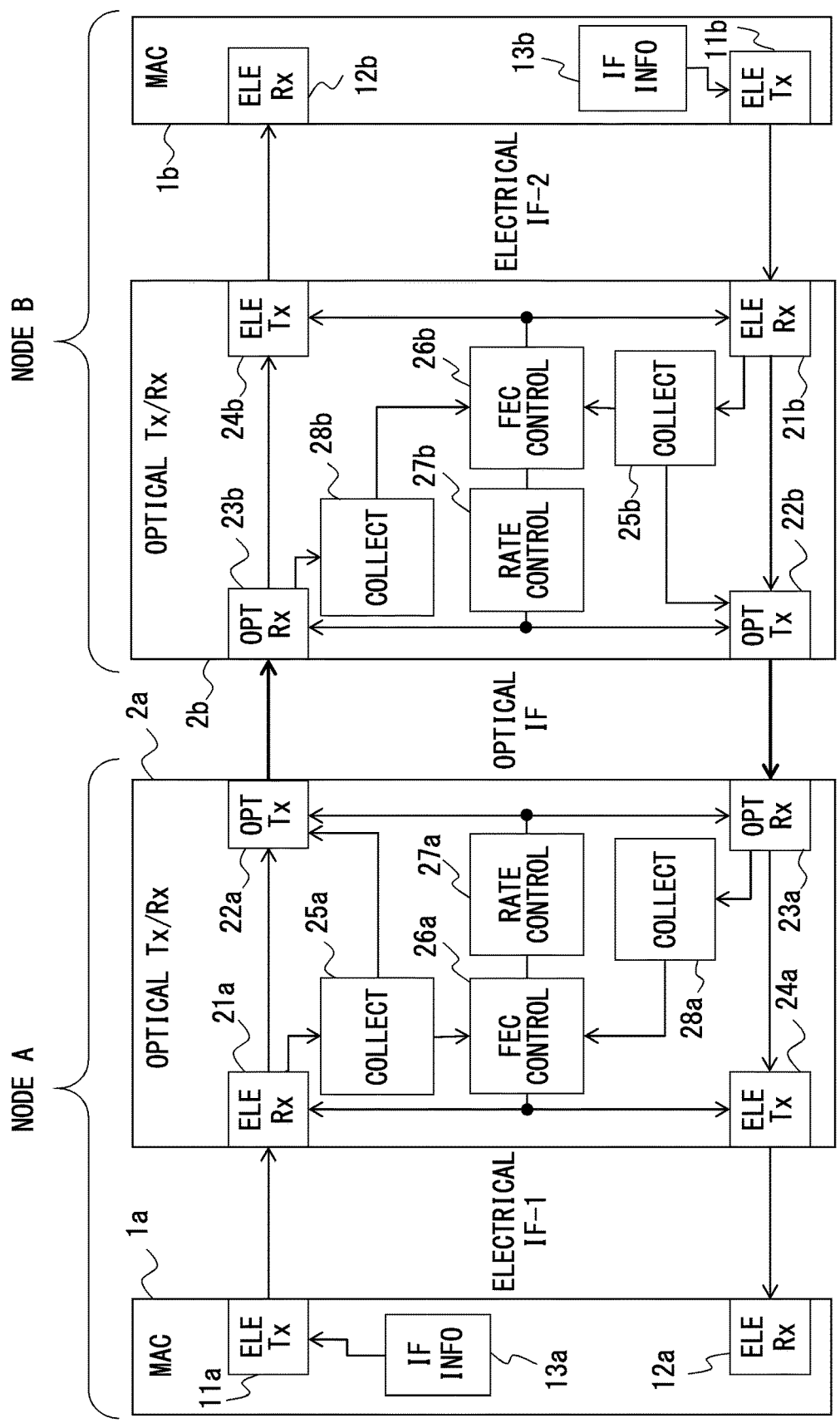
F I G. 8

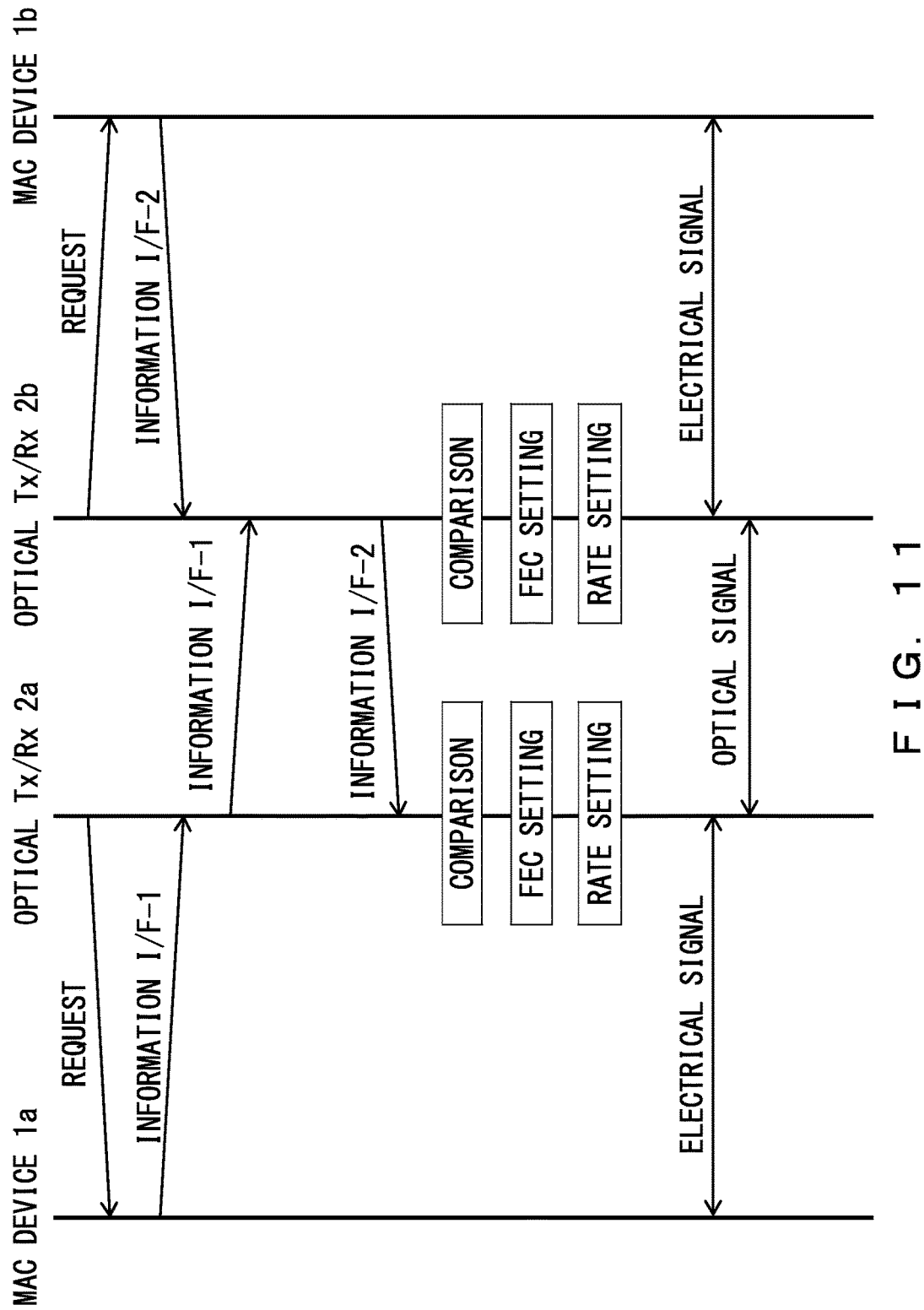
F I G. 11

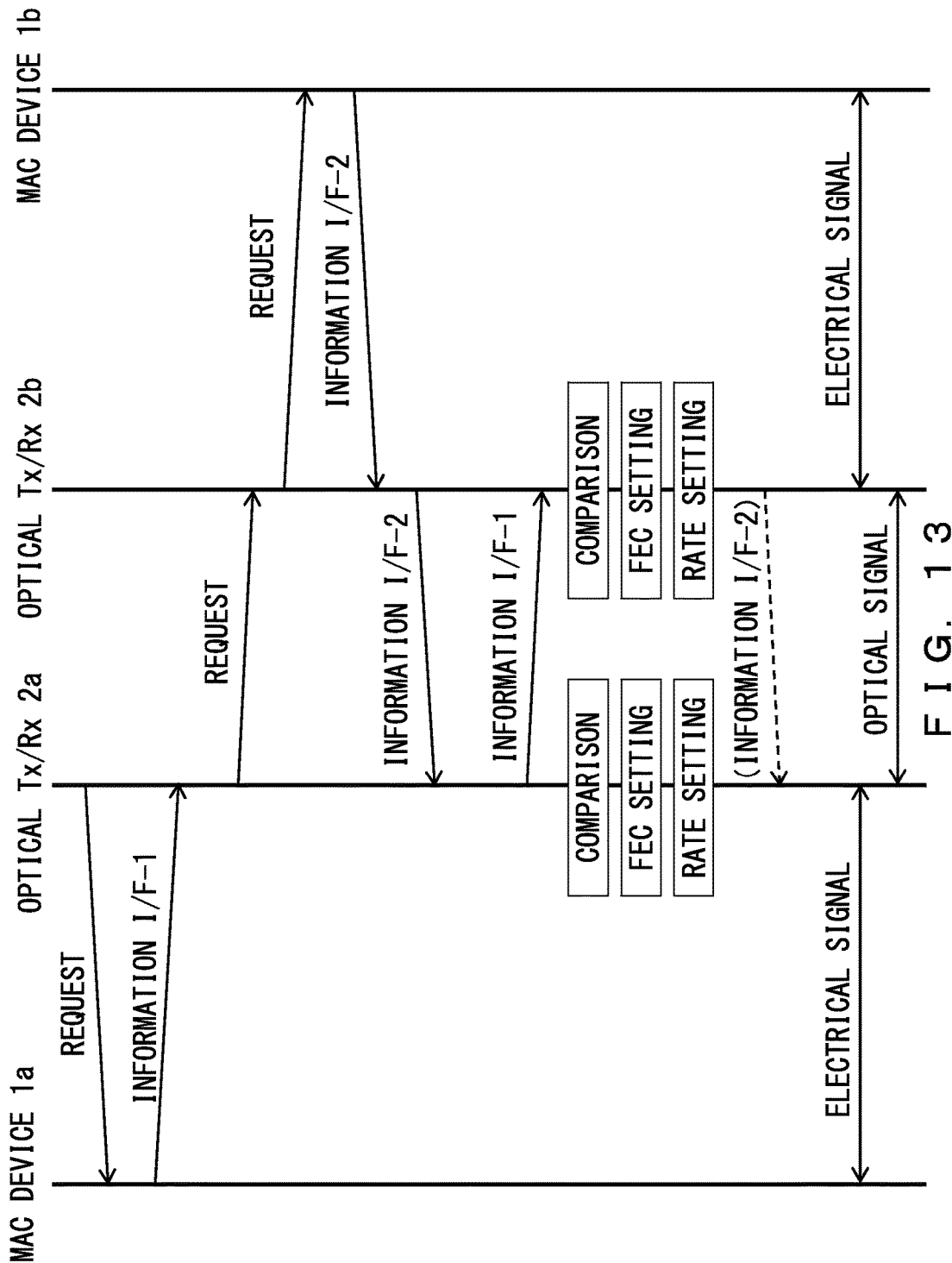
F I G. 13

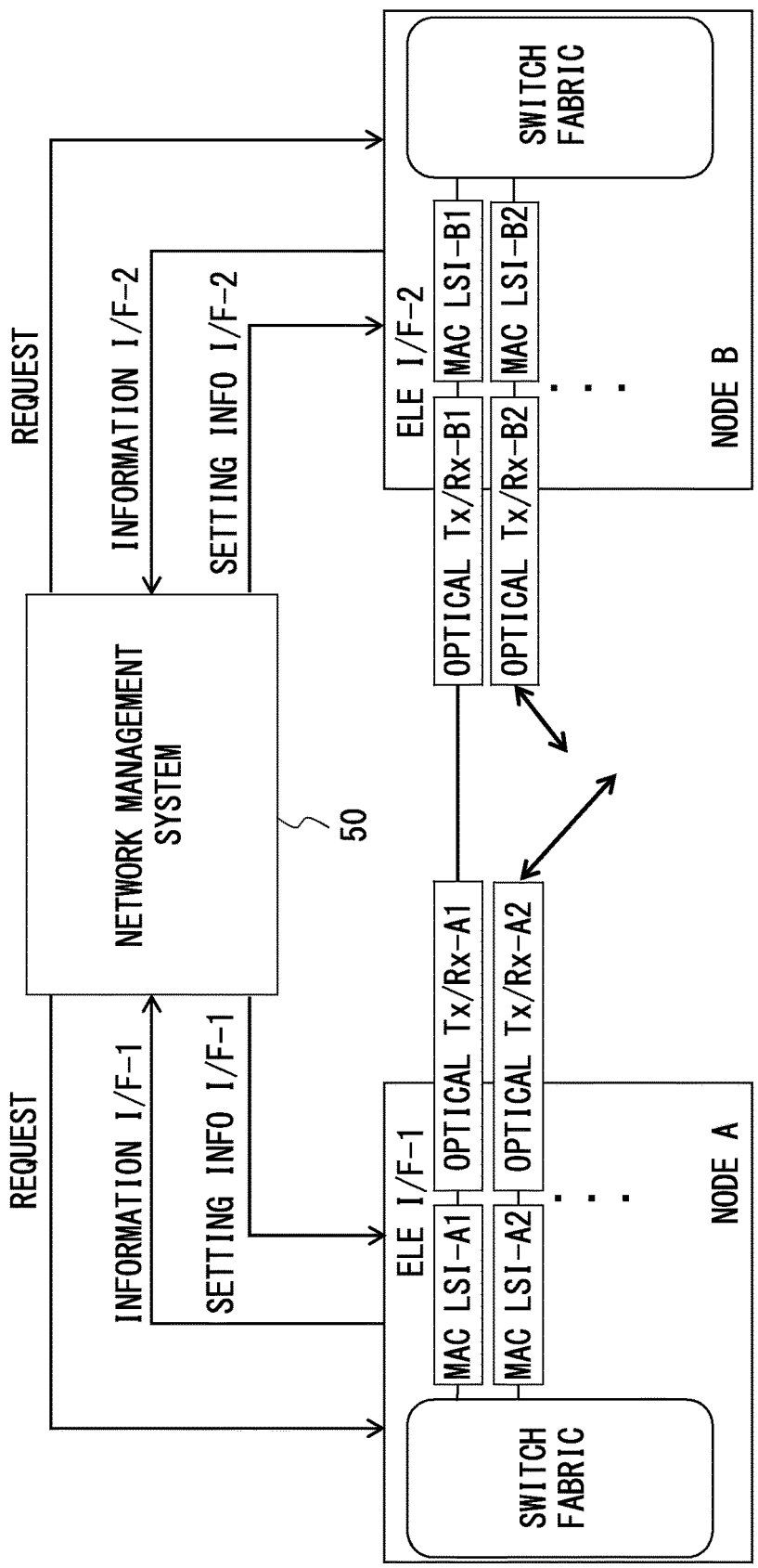
F I G. 15

DEVICE AND METHOD FOR
TRANSMITTING FRAME IN OPTICAL
TRANSMISSION SYSTEM

CROSS-REFERENCE TO RELATED
APPLICATION

This application is a continuation application of International Application PCT/JP2015/050299 filed on Jan. 7, 2015 and designated the U.S., the entire contents of which are incorporated herein by reference.

FIELD

The embodiments discussed herein are related to a transmission device and a transmission method for transmitting a frame in an optical transmission system.

BACKGROUND

In recent years, an increase in a capacity and speed of networks is being requested. Therefore, data may be transmitted using an optical signal not only when a distance between nodes is long but also when a distance between nodes is relatively short.

FIG. 1 illustrates an example of an optical transmission system. In an example illustrated in FIG. 1, in a node A, a media access control (MAC) device 1a and an optical transceiver 2a are provided. Similarly, in a node B, a MAC device 1b and an optical transceiver 2b are provided.

The MAC device 1a stores input data in a frame of a specified format and guides the frame to the optical transceiver 2a. Further, the MAC device 1a extracts data from a frame that has been transmitted from a corresponding node. The optical transceiver 2a converts a frame generated by the MAC device 1a into an optical signal and transmits the optical signal to the corresponding node. Further, the optical transceiver 2a converts an optical signal received from the corresponding node into an electric signal and guides the electric signal to the MAC device 1a. The MAC device 1b and the optical transceiver 2b are substantially the same as the MAC device 1a and the optical transceiver 2a, and therefore descriptions are omitted.

In the optical transmission system having the above configuration, further speeding up of data transmission is requested. In recent years, a configuration in which data of about 100 Gbps is transmitted between nodes has been put into practical use. In addition, a configuration is being studied in which data of about 400 Gbps is transmitted between nodes.

However, as a transmission rate of data becomes higher, a bit error rate tends to become higher. In particular, increasing a speed of electrical circuits is not easy, and therefore when the transmission rate of data is high, a bit error tends to occur in an electrical interface. Therefore, a configuration in which a bit error is detected and corrected using a forward error correction (FEC) in the electrical interface is proposed. In an example illustrated in FIG. 1, in the node A, an FEC is added to a frame transmitted between the MAC device 1a and the optical transceiver 2a, and in the node B, an FEC is added to a frame transmitted between the MAC device 1b and the optical transceiver 2b.

Related technology is described in the following document.
A 400 GbE Architectural Option, IEEE P802.3bs 400 Gb/s Ethernet Task Force, July 2014, San Diego As described above, a configuration in which an error correction is performed using an FEC in the electrical interface is proposed. However, power consumption of a circuit in which the FEC is terminated is not small. For example, power consumption of a circuit in which 100G-KR4 is terminated is about 45 mW and power consumption of a circuit in which 100G-KP4 is terminated is about 105 mW.

SUMMARY

According to an aspect of the present invention, a transmission device is implemented in a first node in an optical transmission system in which a frame is transmitted from the first node to a second node via an optical interface. The transmission device includes: a receiver configured to receive a frame to which an error correction code is added from a frame generator via a first electrical interface; an optical transmitter configured to transmit the frame received by the receiver to the second node via the optical interface; and a decision unit configured to decide, based on first transmission information indicating a data transmission in the first electrical interface and second transmission information indicating a data transmission in a second electrical interface provided between an optical receiver that receives a frame via the optical interface and a frame termination circuit that terminates the frame received by the optical receiver in the second node, whether a type of a first error correction code used in the first electrical interface is the same as a type of a second error correction code used in the second electrical interface. The receiver terminates an error correction code that is added to a received frame and guides the received frame from which the error correction code is removed to the optical transmitter when a type of the first error correction code is different from a type of the second error correction code. The receiver guides a received frame to which an error correction code is added to the optical transmitter without terminating the error correction code when a type of the first error correction code is the same as a type of the second error correction code.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 3 illustrates an example of the optical transmission system according to the embodiment of the present invention.

FIGS. 7A and 7B are flowcharts illustrating FEC setting process.

FIG. 8 illustrates another example of the optical transmission system according to the embodiment of the present invention.

FIGS. 10-15 illustrate examples of an FEC setting sequence.

DESCRIPTION OF EMBODIMENTS

FIGS. 2A-2D are diagrams illustrating an outline of a transmission method according to an embodiment of the present invention. An optical transmission system illustrated in FIGS. 2A-2D includes a node A and a node B. In the node A, a MAC device 1a and an optical transceiver 2a are provided. Similarly, in the node B, a MAC device 1b and an optical transceiver 2b are provided.

The MAC device 1a executes processing of a MAC layer, stores input data in a frame of a specified format, and guides the frame to the optical transceiver 2a. Further, the MAC device 1a extracts data from a frame transmitted from a corresponding node. The optical transceiver 2a converts a frame that is generated by the MAC device 1a into an optical signal and transmits the optical signal to the corresponding node. Further, the optical transceiver 2a converts an optical signal received from the corresponding node into an electric signal and guides the electric signal to the MAC device 1a. Herein, the MAC device 1b and the optical transceiver 2b are substantially the same as the MAC device 1a and the optical transceiver 2a, and therefore descriptions are omitted.

In the following descriptions, in the optical transmission system illustrated in FIGS. 2A-2D, data is assumed to be transmitted from the node A to the node B. In this case, transmission data is provided for the MAC device 1a. As a result, the MAC device 1a generates a frame that stores the transmission data. Specifically, the MAC device 1a can work as a frame generation circuit that generates frames. Then, the optical transceiver 2a transmits the frame that is generated by the MAC device 1a to the node B via an optical interface.

An optical signal transmitted from the node A is propagated to the node B via the optical interface. The optical transceiver 2b converts an optical signal received from the node A into an electric signal and guides the electric signal to the MAC device 1b. At this time, the frame that is generated in the node A is recovered. The MAC device 1b terminates the recovered frame and extracts data from the frame. That is, the MAC device 1b can work as a frame termination circuit that terminates frames.

In this optical transmission system, in order to detect and correct bit errors, an FEC is added to a frame that stores data. Note that FEC is one example of an error correction code. That is, the present invention is not limited to a configuration in which FEC is used for error correction. In other words, data may be corrected by using an error correction code other than FEC. Hereinafter, FEC processing will be described in several cases.

Figure 1:
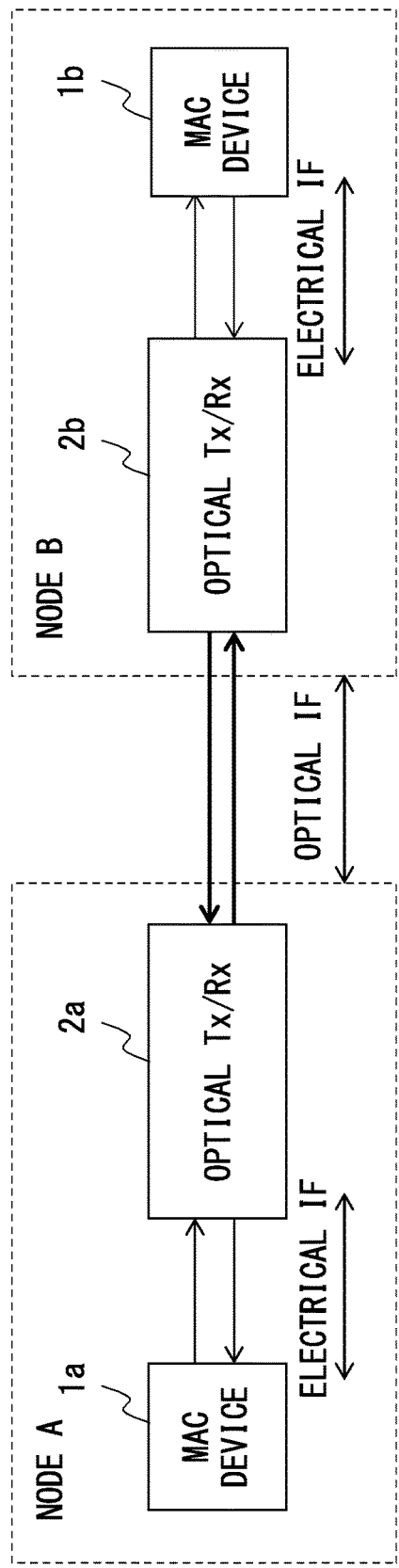
FIG. 1 illustrates an example of an optical transmission system.
Figure 2:
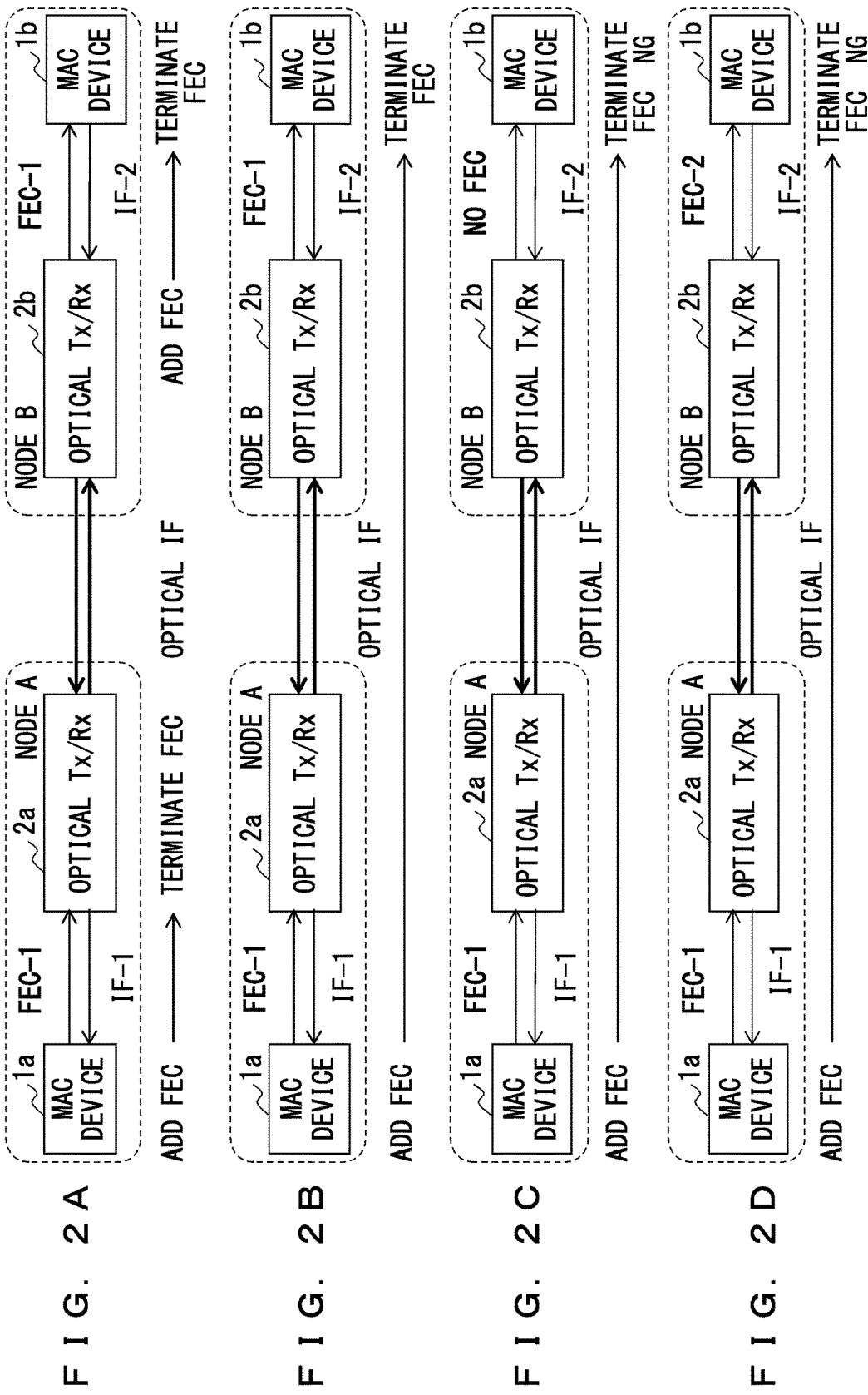
FIGS. 2A-2D are diagrams illustrating an outline of a transmission method according to an embodiment of the present invention.

In a case illustrated in FIG. 2A, FEC-1 is used in the electrical interface IF-1 in the node A. Specifically, the MAC device 1a adds the FEC-1 to a frame. The optical transceiver 2a terminates the FEC-1 that is added to the frame. Specifically, the optical transceiver 2a executes error correction by using the FEC-1 that is added to the frame. Then, the optical transceiver 2a removes the FEC-1 from the frame and transmits the frame from which the FEC-1 is removed to the node B. Similarly, also in the electrical interface IF-2 in the node B, the FEC-1 is used. Specifically, the optical transceiver 2b adds the FEC-1 to the frame received from the node A. Then, the MAC device 1b terminates the FEC-1 that is added to the frame. That is, the MAC device 1b executes error correction by using the FEC-1 that is added to the frame. Then, the MAC device 1b extracts data from the frame.

As described above, in the case illustrated in FIG. 2A, the error corrections are respectively executed in the nodes A and B. Accordingly, not only the MAC device but the optical transceiver (in this example, the optical transceiver 2a in the node A) also executes error correction.

However, when types of the FECs used in a transmission-side node (that is, the node A) and a reception-side node (that is, the node B) are the same as each other, the error corrections are not necessarily executed in the transmission-side node and the reception-side node, respectively. That is, as illustrated in FIG. 2B, when the error correction is executed between the MAC devices 1a and 1b, a bit error that occurs in the node A and a bit error that occurs in the node B may be corrected.

In a case illustrated in FIG. 2B, the MAC device 1a adds the FEC-1 to a frame. The optical transceiver 2a does not terminate the FEC-1 but transmits the frame to which the FEC-1 is added to the node B. The optical transceiver 2b guides the frame received from the node A to the MAC device 1b. The MAC device 1b terminates the FEC-1 that is added to the frames. That is, the MAC device 1b executes error correction by using the FEC-1 that is added to the frame.

As described above, when the types of the FECs used in the transmission-side node and the reception-side node are the same as each other, even if the FEC is not terminated in the optical transceiver, bit errors that occur in the transmission-side node and the reception-side node may be corrected. Herein, in the case illustrated in FIG. 2B as compared with the case illustrated in FIG. 2A, power consumption to terminate the FEC is deleted in the optical transceiver 2a. In addition, power consumption to add the FEC to the received frame is deleted in the optical transceiver 2b.

Note, however, that as illustrated in FIG. 2C, when the error correction is not executed in either one of the transmission-side node and the reception-side node, the error correction fails to be executed between the MAC devices 1a and 1b. In this case, the optical transceiver 2a terminates the FEC that is added to a frame by the MAC device 1a. In addition, as illustrated in FIG. 2D, when the types of the FECs used in the transmission-side node and the reception-side node are different from each other, the error correction fails to be executed between the MAC devices 1a and 1b. Also in this case, the optical transceiver 2a terminates the FEC that is added to a frame by the MAC device 1a.

In order to solve the above problem, the node A compares a type of an FEC used in the node A with a type of an FEC used in the node B. Then, when both of the types of the FECs are the same as each other, the node A transmits a frame to which the FEC is added to the node B without terminating the FEC. Then, the FEC that is added to the frame in the node A is terminated by the MAC device 1b in the node B. This transmission method permits power consumption of the optical transceiver (in particular, the optical transceiver in the transmission-side node) to be reduced.

FIG. 3 illustrates an example of the optical transmission system according to the embodiment of the present invention. The MAC device 1a and the optical transceiver 2a are provided in the node A. The MAC device 1b and the optical transceiver 2b are provided in the node B. The MAC devices 1a and 1b respectively execute processing of the MAC layer. Specifically, the MAC devices 1a and 1b can store input data in a frame of the specified format and can extract data from a received frame.

The MAC device 1a includes a transmitter 11a and a receiver 12a. Note that the MAC device 1a may include other circuit elements. The transmitter 11a stores input data in a frame and transmits the frame to the optical transceiver 2a via the electrical interface IF-1. At this time, the MAC device 1a adds an FEC to the transmission frame. The receiver 12a extracts data from a frame received from the optical transceiver 2a via the electrical interface IF-1. When an FEC is added to the received frame, the MAC device 1a can terminate the FEC. In the electrical interface IF-1 between the MAC device 1a and the optical transceiver 2a, a plurality of electric signals may be transmitted in parallel via a plurality of physical lanes.

The optical transceiver 2a includes a receiver 21a, an optical transmitter 22a, an optical receiver 23a, a transmitter 24a, an electrical IF information collection unit 25a, an FEC controller 26a, an optical IF rate controller 27a and an electrical IF information collection unit 28a. In addition, the optical transceiver 2a may include other circuit elements.

The receiver 21a receives a frame from the MAC device 1a via the electrical interface IF-1. When an FEC is added to the received frame, the receiver 21a terminates the FEC, if necessary. At this time, the receiver 21a decides whether to terminate the FEC of the received frame in accordance with an instruction provided from the FEC controller 26a. The optical transmitter 22a transmits the frame to the node B via the optical interface. At this time, the optical transmitter 22a transmits the frame to the node B at a rate that is instructed by the optical IF rate controller 27a.

The optical receiver 23a receives a frame from the node B via the optical interface. At this time, the optical receiver 23a receives the frame at a rate that is instructed by the optical IF rate controller 27a. The transmitter 24a transmits the frame that is received by the optical receiver 23a to the MAC device 1a via the electrical interface IF-1. At this time, in accordance with an instruction provided from the FEC controller 26a, the transmitter 24a can add an FEC to the frame to be transmitted to the MAC device 1a.

In the optical interface between the nodes A and B, for example, data is transmitted using a discrete multi-tone (DMT) modulation scheme; however, it is not particularly limited thereto. In this case, a plurality of DMT modulated optical signals may be transmitted using a plurality of wavelength channels.

The electrical IF information collection unit 25a collects transmission information indicating data transmission in the electrical interface IF-1 between the MAC device 1a and the optical transceiver 2a. For example, the transmission information includes at least one of the following items.
(1) Transmission rate
(2) Modulation scheme
(3) Number of physical lanes
(4) Name of the standard of the interface
(5) Previously measured bit error rate
Note that the transmission information is not limited to the above items (1) to (5). Examples of the transmission information may include information for identifying a type of the FEC.

The electrical IF information collection unit 25a provides the collected transmission information for the FEC controller 26a. In addition, the electrical IF information collection unit 25a can transmit the collected transmission information to the node B by using the optical transmitter 22a. Herein, the transmission information is previously recorded, for example, in a memory within the optical transceiver. In this case, the electrical IF information collection unit 25a reads out the transmission information from the memory within the optical transceiver. Alternatively, the transmission information is recorded in a memory within the MAC device. In this case, the electrical IF information collection unit 25a obtains the transmission information from the MAC device.

Based on the transmission information of the electrical interface IF-1 and that of the electrical interface IF-2, the FEC controller 26a decides whether the types of the FECs used in the electrical interface IF-1 and the electrical interface IF-2 are the same as each other. At this time, the FEC controller 26a may recognize the types of the FECs used in the electrical interfaces IF-1 and IF-2. Then, based on this decision result, the FEC controller 26a provides the FEC instruction indicating FEC setting for the receiver 21a and the transmitter 24a. In addition, based on this decision result, the FEC controller 26a provides a rate instruction indicating a transmission rate of the optical interface for the optical IF rate controller 27a.

In accordance with the rate instruction provided from the FEC controller 26a, the optical IF rate controller 27a controls the optical transmitter 22a and the optical receiver 23a. Specifically, in accordance with the rate instruction provided from the FEC controller 26a, the optical IF rate controller 27a controls a transmission rate of the optical transmitter 22a and controls a reception rate of the optical receiver 23a.

The electrical IF information collection unit 28a obtains transmission information of the electrical interface IF-2, which is transmitted from the node B. Then, the electrical IF information collection unit 28a provides the transmission information that is obtained from the node B for the FEC controller 26a.

The electrical IF information collection units 25a and 28a, the FEC controller 26a, and the optical IF rate controller 27a are implemented, for example, using a processor system. The processor system includes a processor element and a memory. In this case, the processor element executes a program that is stored in the memory to perform the FEC setting. Note that the electrical IF information collection units 25a and 28a, the FEC controller 26a, and the optical IF rate controller 27a may be implemented by a signal processing circuit. In addition, the electrical IF information collection units 25a and 28a, the FEC controller 26a, and the optical IF rate controller 27a may be implemented by a combination of software and hardware.

In the same manner as in the MAC device 1a, the MAC device 1b provided in the node B includes a transmitter 11b and a receiver 12b. Further, in the same manner as in the optical transceiver 2a, the optical transceiver 2b provided in the node B includes a receiver 21b, an optical transmitter 22b, an optical receiver 23b, a transmitter 24b, an electrical IF information collection unit 25b, an FEC controller 26b, an optical IF rate controller 27b, and an electrical IF information collection unit 28b. A configuration of the MAC device 1b is substantially the same as that of the MAC device 1a, and a configuration of the optical transceiver 2b is substantially the same as that of the optical transceiver 2a. Therefore, with regard to the MAC device 1b and the optical transceiver 2b, descriptions are omitted.

Note, however, that the electrical interfaces IF-1 and IF-2 are not necessarily the same as each other. That is, the electrical interfaces IF-1 and IF-2 may be different from each other.

In this optical transmission system, when the data transmission is performed between the nodes A and B, a configuration for processing the FEC is determined before the data transmission. In the following descriptions, a configuration according to the data transmission from the node A to the node B is assumed to be determined. However, when the nodes A and B are connected to each other, a configuration according to the data transmission from the node A to the node B and a configuration according to the data transmission from the node B to the node A may be determined simultaneously.

When the nodes A and B are connected to each other, in the node A, the electrical IF information collection unit 25a collects the transmission information indicating the data transmission of the electrical interface IF-1. As described above, the transmission information includes at least one of the transmission rate, the modulation scheme, the number of the physical lanes, a name of the standard of the interface, and the previously measured bit error rate.

The transmission rate is, for example, 100 Gbps or 400 Gbps. The modulation scheme is a modulation scheme of a signal to be transmitted between the MAC device 1a and the optical transceiver 2a. The number of the physical lanes is, for example, 4 lanes, 8 lanes, or 16 lanes. The name of the standard of the interface is, for example, CAUI-4, CDAUI-8, or CDAUI-16. The bit error rate is previously measured and recorded in a specified memory area within the optical transceiver 2a. It is assumed that the electrical IF information collection unit 25a can collect the transmission information by accessing the receiver 21a or by accessing the specified memory area within the optical transceiver 2a.

The electrical IF information collection unit 25a provides the collected transmission information for the FEC controller 26a. Further, the electrical IF information collection unit 25a transmits the collected transmission information to the node B by using the optical transmitter 22a. The transmission information transmitted from the node A to the node B is provided for the FEC controller 26b in the node B.

Similarly, in the node B, the electrical IF information collection unit 25b collects the transmission information indicating the data transmission of the electrical interface IF-2. Then, the electrical IF information collection unit 25b provides the collected transmission information for the FEC controller 26b. Further, the electrical IF information collection unit 25b transmits the collected transmission information to the node A by using the optical transmitter 22b. The transmission information transmitted from the node B to the node A is provided for the FEC controller 26a in the node A.

Based on the above procedure, the FEC controller 26a in the node A obtains the transmission information (hereinafter, referred to as "transmission information IF-1") indicating the data transmission of the electrical interface IF-1 and the transmission information (hereinafter, referred to as "transmission information IF-2") indicating the data transmission of the electrical interface IF-2. Similarly, the FEC controller 26b in the node B also obtains transmission information IF-1 and transmission information IF-2.

The FEC controller 26a compares transmission information IF-1 with transmission information IF-2. Then, when transmission information IF-1 is matched with transmission information IF-2, the FEC controller 26a decides that the types of the FECs used in the electrical interfaces IF-1 and IF-2 are the same as each other. On the other hand, when transmission information IF-1 is not matched with transmission information IF-2, the FEC controller 26a decides that the types of the FECs used in the electrical interfaces IF-1 and IF-2 are different from each other. Note that the FEC controller 26a can determine each type of the FECs used in the electrical interfaces IF-1 and IF-2 based on transmission information IF-1 and transmission information IF-2. Thus, by using this determination result, the FEC controller 26a may decide whether the types of the FECs used in the electrical interfaces IF-1 and IF-2 are the same as each other.

It is preferable that the types of the FECs used in the electrical interfaces IF-1 and IF-2 are determined, for example, in accordance with the bit error rates of the electrical interfaces IF-1 and IF-2. The bit error rates of the electrical interfaces IF-1 and IF-2 depend on the transmission rates, the modulation schemes, the number of the physical lanes, the standards of the interface, or the like of the electrical interfaces IF-1 and IF-2. Accordingly, in this example, the types of the FECs used in the electrical interfaces IF-1 and IF-2 are assumed to correspond to the transmission rates, the modulation schemes, the number of the physical lanes, and/or the standards of the interface in the electrical interfaces IF-1 and IF-2. Specifically, in this example, the FEC controller 26a can determine the types of the FECs used in the electrical interfaces IF-1 and IF-2 based on transmission information IF-1 and transmission information IF-2.

When the types of the FECs used in the electrical interfaces IF-1 and IF-2 are the same as each other, as described above with reference to FIG. 2B, an error correction can be performed between the MAC devices 1a and 1b without terminating the FEC in the optical transceiver 2a. Therefore, when the types of the FECs used in the electrical interfaces IF-1 and IF-2 are the same as each other, the FEC controller 26a provides the receiver 21a with the FEC instruction not to terminate the FEC. On the other hand, when the types of the FECs used in the electrical interfaces IF-1 and IF-2 are different from each other, it is necessary to terminate the FEC in the optical transceiver 2a, as described above with reference to FIGS. 2C and 2D. Accordingly, in this case, the FEC controller 26a provides the receiver 21a with the FEC instruction to terminate the FEC.

Figure 4:
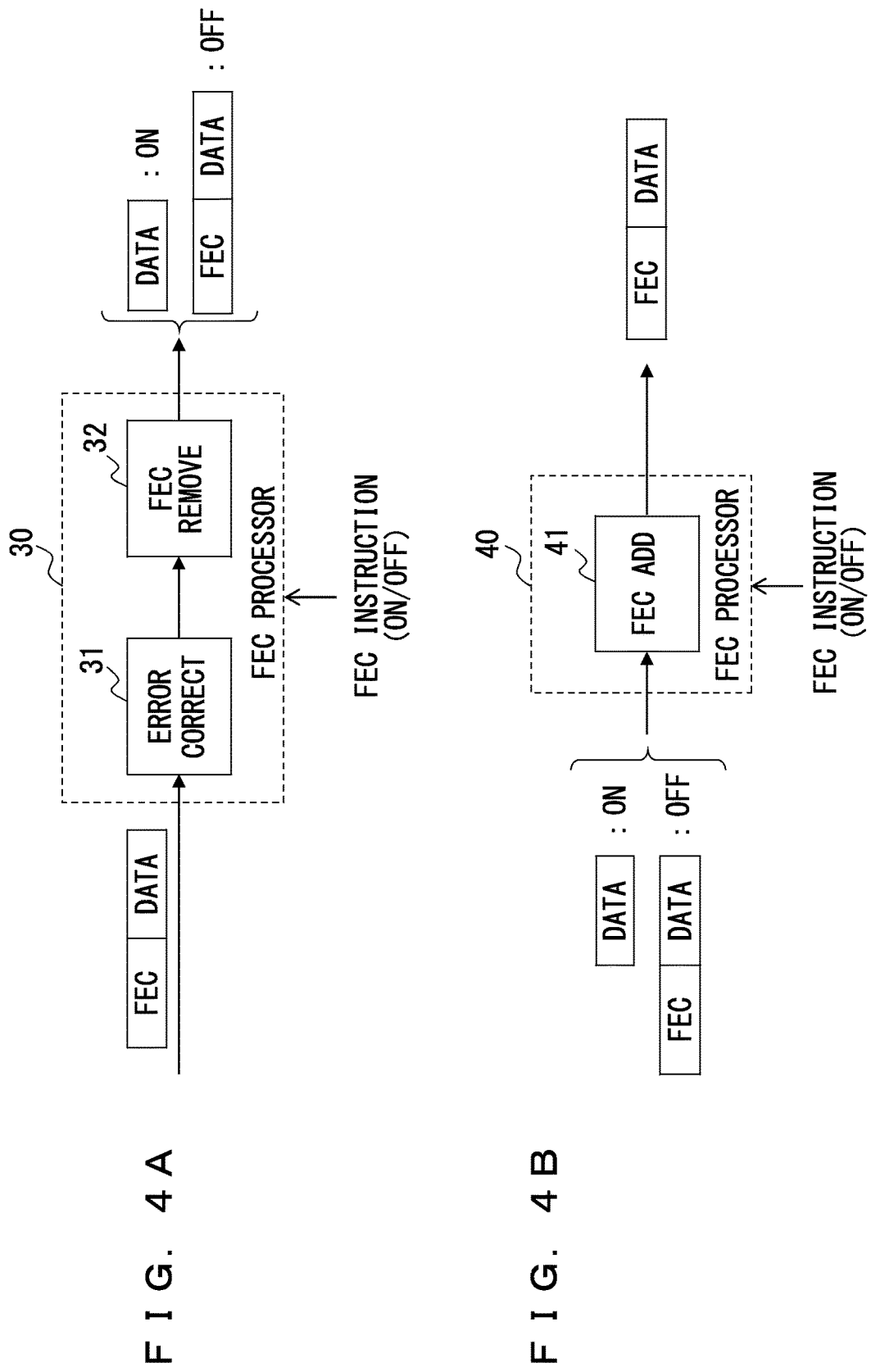
FIGS. 4A and 4B illustrate examples of a configuration of a receiver provided in an optical transceiver.

FIG. 4A illustrates an example of a configuration of the receiver provided in the optical transceiver in the transmission-side node. This receiver corresponds to the receiver 21a provided in the optical transceiver 2a in the node A in the example in FIG. 3. In this example, the receiver 21a includes an FEC processor 30. The FEC processor 30 includes an error correction unit 31 and an FEC removing unit 32. In FIG. 4A, the other circuit elements within the receiver 21a are omitted.

A frame received from the MAC device 1a is guided to the FEC processor 30. Herein, an FEC is added to the frame received from the MAC device 1a.

For the FEC processor 30, the FEC instruction is provided from the FEC controller 26a. When the FEC instruction indicating an ON state is provided for the FEC processor 30, the FEC processor 30 terminates the FEC that is added to the received frame. Specifically, the error correction unit 31 corrects an error of data by using the FEC. Then, the FEC removing unit 32 removes the FEC from the frame. In contrast, when the FEC instruction indicating an OFF state is provided for the FEC processor 30, the FEC processor 30 does not perform the FEC processing. In this case, the error correction is not performed and the FEC is not removed from the frame.

When the types of the FECs used in the electrical interfaces IF-1 and IF-2 are the same as each other, the FEC instruction indicating an OFF state is provided for the FEC processor 30. In this case, since the error correction is not performed in the receiver 21a, power consumption of the optical transceiver 2a is suppressed.

Note, however, that in this embodiment, the optical transceiver 2a may transmit a frame to which the FEC is added to the node B, or may transmit a frame from which the FEC is removed to the node B. Herein, when the FEC is added to the frames, it is necessary to increase a transmission rate of an optical signal to be transmitted via the optical interface as compared with when the FEC is removed from the frame. For example, when the FEC is 100G-KP4 (RS (544, 514, T=15, M=10)), an overhead is about 3 percent. Accordingly, in the case of using this FEC, when the FEC is added to the frame, it is necessary to increase by about 3 percent the transmission rate of an optical signal to be transmitted via the optical interface as compared with when the FEC is removed from the frame.

Therefore, the FEC controller 26a provides the rate instruction indicating the transmission rate of the optical interface for the optical IF rate controller 27a. The rate instruction includes information indicating whether to terminate the FEC within the optical transceiver 2a and information indicating a type of the FEC.

In accordance with the rate instruction provided from the FEC controller 26a, the optical IF rate controller 27a controls the transmission rate of the optical transmitter 22a. For example, when the transmission scheme of the optical interface is non-return to zero (NRZ) or pulse amplitude modulation 4 (PAM4), the optical IF rate controller 27a controls a clock rate of the optical transmitter 22a in accordance with the rate instruction. Further, when the transmission scheme of the optical interface is a DMT, the optical IF rate controller 27a controls a sampling rate or a bit allocation in accordance with the rate instruction. Herein, the DMT modulation is described briefly with reference to FIG. 5 and FIGS. 6A-6C.

Figure 5:
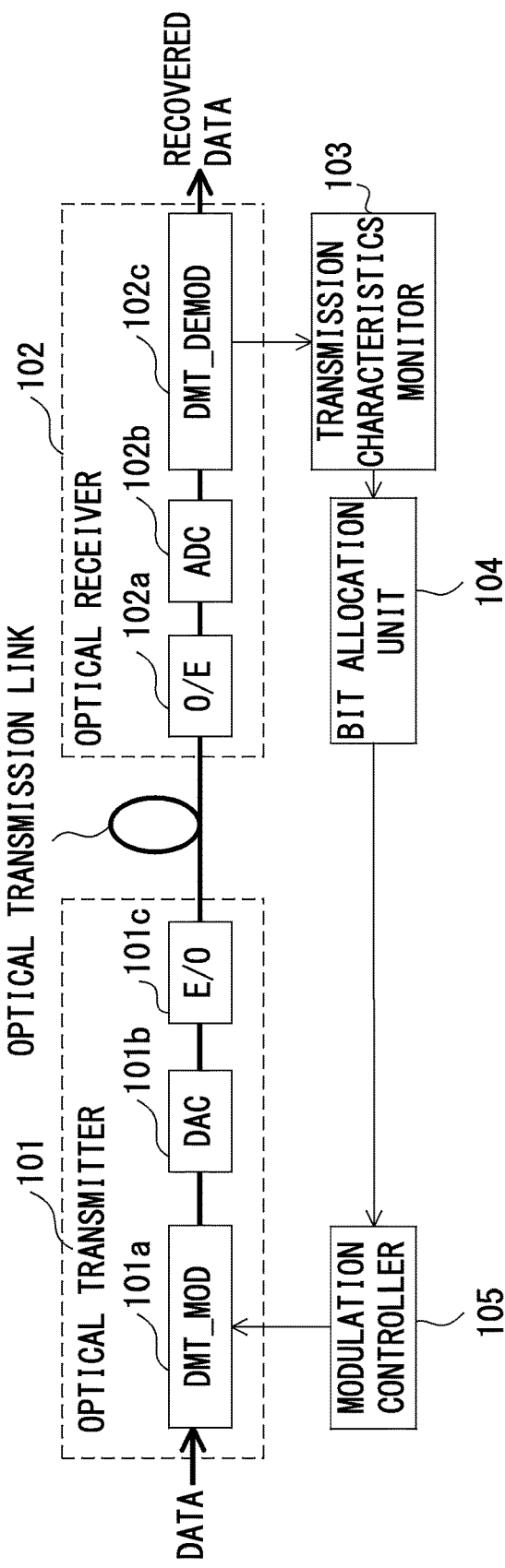
FIG. 5 illustrates an example of the optical transmission system that transmits data by using a DMT modulation.

FIG. 5 illustrates an example of the optical transmission system that transmits data by using the DMT modulation. Herein, a DMT modulated optical signal is assumed to be transmitted from an optical transmitter 101 to an optical receiver 102. Between the optical transmitter 101 and the optical receiver 102, an optical fiber transmission link is provided. On the optical fiber transmission path, one or a plurality of optical amplifiers may be provided.

The optical transmitter 101 includes a DMT modulator 101a, a digital-to-analog converter (DAC) 101b, and an E/O device 101c. The DMT modulator 101a generates a DMT modulated signal from data. At this time, the data is divided and allocated to a plurality of sub-carriers. Therefore, even when high-speed data is transmitted, a speed of the data allocated to each sub-carrier can be slow. Frequencies of the plurality of sub-carriers are different from each other.

The D/A converter 101b converts the DMT modulated generated by the DMT modulator 101a into an analog signal. Then, the E/O device 101c generates a DMT modulated optical signal from the analog DMT modulated signal. The E/O device 101c is realized by, for example, direct modulation laser device.

Figure 6A:
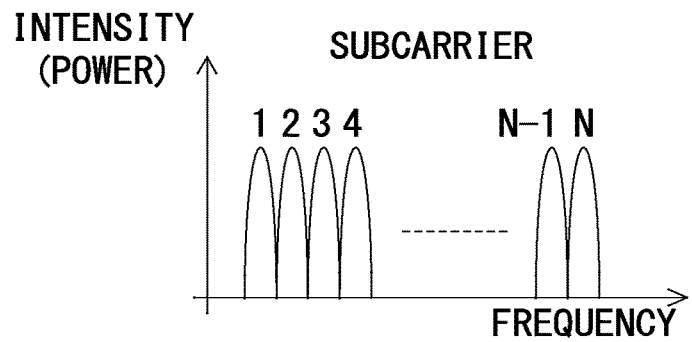
FIGS. 6A-6C are diagrams illustrating the DMT modulation.

FIG. 6A illustrates an example of spectra of the DMT modulated optical signal. In this example, data is transmitted using N sub-carriers 1 to N in the DMT modulation. Further, an optical intensity (or optical power) of each sub-carrier is approximately equalized to each other. This DMT modulated optical signal is transmitted through the optical fiber transmission link and is received by the optical receiver 102.

The optical receiver 102 includes an O/E device 102a, an analog-to-digital converter (ADC) 102b, and a DMT demodulator 102c. The O/E device 102a converts the received DMT modulated optical signal into an electric signal. The O/E device 102a is, for example, configured to include a photodiode. The A/D converter 102b converts an output signal of the O/E device 102a into a digital signal. Then, the DMT demodulator 102c performs DMT demodulation on the digital signal so as to recover data.

In this optical transmission system, the bit allocation for the sub-carriers is determined, for example, based on transmission characteristics between the transmission devices. The transmission characteristics are specified, for example, using a signal-to-noise ratio (SNR) that is monitored by the optical transmission device on the reception side. Specifically, a transmission characteristics monitor 103 monitors the SNR of the DMT modulated optical signal received from the optical transmitter 101. In this case, the transmission characteristics monitor 103 monitors the SNR for each sub-carrier.

Figure 6B:
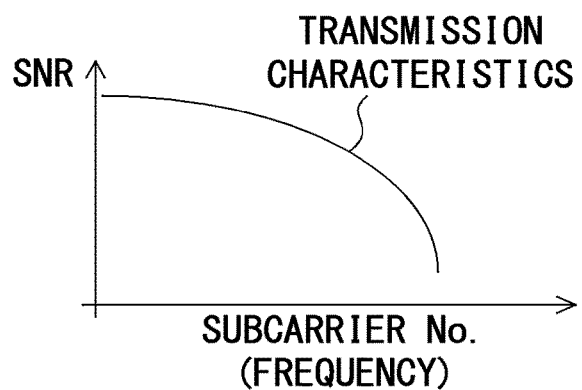
Figure 6C:
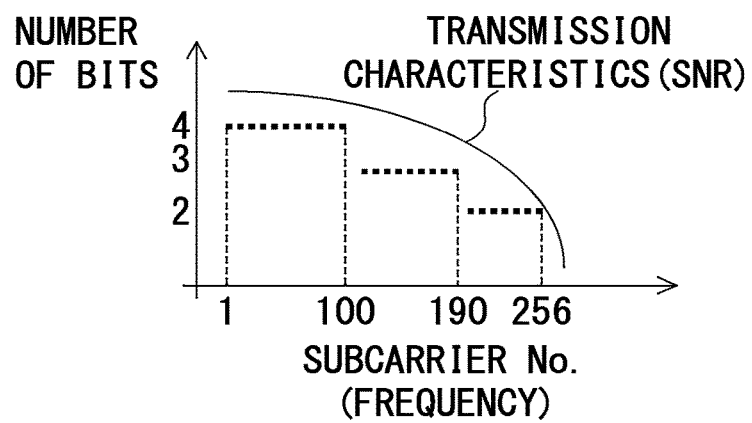

FIG. 6B illustrates an example of the transmission characteristics measured by the transmission characteristics monitor 103. A horizontal axis represents sub-carrier numbers (1 to N) for identifying each sub-carrier. A longitudinal axis represents an SNR. In this example, the transmission characteristics are preferable in a frequency domain in which the sub-carrier number is small, and the transmission characteristics deteriorate in a frequency domain in which the sub-carrier number is large.

Based on the transmission characteristics measured by the transmission characteristics monitor 103, a bit allocation unit 104 determines a bit allocation for each sub-carrier. Specifically, the number of bits to be transmitted in one symbol is determined for each sub-carrier. At this time, the number of bits allocated to a sub-carrier with a high SNR is large, and the number of bits allocated to a sub-carrier with a low SNR is small. In an example illustrated in FIG. 6C, "4 bits" are respectively allocated to sub-carriers 1 to 100, "3 bits" are respectively allocated to sub-carriers 101 to 190, and "2 bits" are respectively allocated to sub-carriers 191 to 256.

In accordance with the bit allocation determined by the bit allocation unit 104, a modulation controller 105 specifies a modulation scheme of each sub-carrier. For sub-carriers to which "2 bits" are allocated, for example, the modulation scheme corresponding to QPSK is specified. For sub-carriers to which "3 bits" are allocated, the modulation scheme corresponding to 8PSK is specified. For sub-carriers to which "4 bits" are allocated, the modulation scheme corresponding to 16QAM is specified. As a result, the DMT modulator 101a modulates each sub-carrier by using the modulation scheme specified by the modulation controller 105.

The optical transmitter 22a and the optical receiver 23b illustrated in FIG. 3 correspond to the optical transmitter 101 and the optical receiver 102 illustrated in FIG. 3, respectively. When the transmission scheme of the optical interface illustrated in FIG. 3 is the DMT modulation, the optical IF rate controller 27a controls a sampling rate or a bit allocation in accordance with the rate instruction.

In this case, in the optical transmitter 22a, transmission data to the node B is stored in a memory. Then, the data that is read out from this memory is distributed to the sub-carriers. The sampling rate corresponds to a read rate for reading out data from this memory. Note that, when the optical transceiver 2a does not terminate the FEC, the optical IF rate controller 27a increases this sampling rate as compared with when the optical transceiver 2a terminates the FEC.

Alternatively, the optical IF rate controller 27a may change the bit allocation for the each sub-carriers while maintaining this sampling rate. For example, when the optical transceiver 2a does not terminate the FEC, the optical IF rate controller 27a increases the number of bits allocated to a specified number of sub-carriers as compared with when the optical transceiver 2a terminates the FEC. The "bit allocation" corresponds to the modulation scheme. Specifically, increasing the bit allocation means that a modulation scheme in which the number of bits per symbol is small is switched to a modulation scheme in which the number of bits per symbol is large.

An optical signal that is generated in the node A as described above is transmitted to the node B via the optical interface. In the node B, the optical transceiver 2b receives the optical signal via the optical interface.

In the node B, in the same manner as in the FEC controller 26a, the FEC controller 26b determines each type of the FECs used in the electrical interfaces IF-1 and IF-2, and decides whether the types of the FECs used in the electrical interfaces IF-1 and IF-2 are the same as each other. Then, the FEC controller 26b provides the rate instruction for the optical IF rate controller 27b and provides the FEC instruction for the transmitter 24b. Here, the FEC controllers 26a and 26b decide whether the types of the FECs are the same as each other based on the same information (that is, transmission information IF-1 and transmission information IF-2). Accordingly, the same decision results are obtained in the nodes A and B.

In accordance with the rate instruction provided from the FEC controller 26b, the optical IF rate controller 27b controls a reception rate of the optical receiver 23b. Specifically, when the FEC is added to the received frame, the optical IF rate controller 27b increases a rate for receiving an optical signal from the optical interface as compared with when the FEC is removed from the received frames. At this time, when the transmission scheme of the optical interface is NRZ or PAM4, the optical IF rate controller 27b controls a clock rate of the optical receiver 3b in accordance with the rate instruction. Further, when the transmission scheme of the optical interface is the DMT modulation, the optical IF rate controller 27b controls a sampling rate or a bit allocation in accordance with the rate instruction.

In the optical receiver 23b, the data received from the node A is stored in a memory. Then, the data that is read out from the memory is guided to the MAC device 1b via the transmitter 24b. The sampling rate corresponds to a read rate for reading out the data from this memory. Further, the bit allocation for the sub-carriers specifies demodulation scheme for respective sub-carriers.

The transmitter 24b processes the received frame in accordance with the FEC instruction provided from the FEC controller 26b. FIG. 4B illustrates an example of a configuration of the transmitter provided within the optical transceiver in the reception-side node. This transmitter corresponds to the transmitter 24b provided within the optical transceiver 2b in the node B in the example in FIG. 3. In this example, the transmitter 24b includes an FEC processor 40. The FEC processor 40 includes an FEC adding unit 41. In FIG. 4B, the other circuit elements in the transmitter 24b are omitted.

When the types of the FECs used in the electrical interfaces IF-1 and IF-2 are different from each other, the FEC is not added to a frames that is transmitted from the node A, as described above. In this case, the FEC controller 26b provides the FEC instruction indicating an ON state for the transmitter 24b. As a result, the FEC adding unit 41 adds the FEC to the received frame. On the other hand, when the types of the FECs used in the electrical interfaces IF-1 and IF-2 are the same as each other, the FEC is added to a frame that is transmitted from the node A, as described above. In this case, the FEC controller 26b provides the FEC instruction indicating an OFF state for the transmitter 24b. As a result, the received frame is not processed by the FEC processor 40, but are guided to the MAC device 1b.

As described above, according to the transmission method of the embodiment, when the types of the FECs used in the transmission-side node and the reception-side node are the same as each other, the FEC processing is not performed in the optical transceiver. Accordingly, in the transmission-side node, power consumption for the error correction is deleted. Further, in the reception-side node, power consumption to generate the FEC and to add the FEC to a frame is deleted.

In the above-described example, a case in which data is transmitted from the node A to the node B is described; further, when data is transmitted from the node B to the node A, a configuration for processing the FEC is determined by using the same procedure. Note that, when the transmission scheme of the optical interface is the DMT modulation, the above-described FEC setting may be performed in a negotiation for determining the bit allocation of sub-carriers.

Further, when the transmission scheme of the optical interface is the DMT modulation, the transmission information may be communicated between the nodes A and B by using one sub-carrier specified from among a plurality of sub-carriers. Alternatively, the transmission information may be communicated between the nodes by using a control signal that is transmitted apart from a main data signal.

Figure 7A:
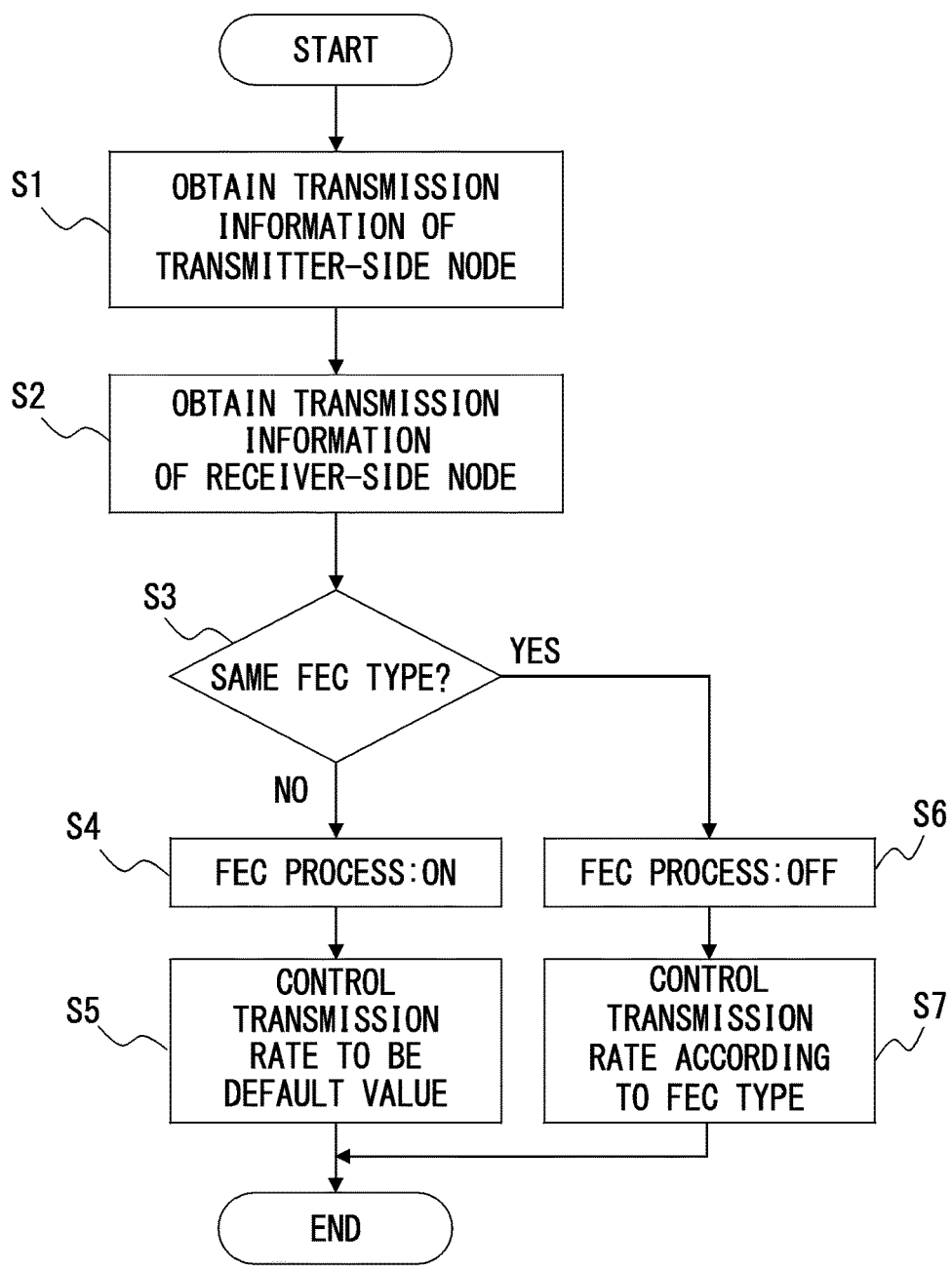

FIG. 7A is a flowchart illustrating FEC setting process in the transmission-side node. In the following descriptions, the FEC setting process is assumed to be performed in the optical transceiver 2a in the node A.

In S1, the FEC controller 26a obtains the transmission information (that is, transmission information IF-1) indicating the data transmission of the electrical interface (that is, the electrical interface IF-1) between the MAC device and optical transceiver in the transmission-side node. In S2, the FEC controller 26a obtains the transmission information (that is, transmission information IF-2) indicating the data transmission of the electrical interface (that is, the electrical interface IF-2) between the MAC device and optical transceiver in the reception-side node. Herein, the FEC controller 26a may perform S2 before S1.

In S3, based on the obtained transmission information, the FEC controller 26a decides whether the types of the FECs used in the electrical interfaces in the transmission-side node and the reception-side node are the same as each other. At this time, the FEC controller 26a recognizes each type of the FECs used in the electrical interfaces in the transmission-side node and the reception-side node.

When the types of the FECs used in the transmission-side node and the reception-side node are different from each other, in S4, the FEC controller 26a generates the FEC instruction for controlling the FEC processing to an ON state. After this FEC instruction is provided, the receiver 21a terminates the received frame. Specifically, the error correction is performed and the FEC is removed from the received frame. In addition, in S5, the FEC controller 26a generates the rate instruction for controlling the transmission rate to a default value. After this rate instruction is provided, the optical IF rate controller 27a controls the transmission rate of the optical transmitter 22a to the default value.

On the other hand, when the types of the FECs used in the transmission-side node and the reception-side node are the same as each other, in S6, the FEC controller 26a generates the FEC instruction for controlling the FEC processing to an OFF state. After this FEC instruction is provided, the receiver 21a does not terminate the received frames. Specifically, a frame to which the FEC is added is guided from the receiver 21a to the optical transmitter 22a. Further, in S7, the FEC controller 26a generates the rate instruction for controlling the transmission rate in accordance with the type of the FEC. By doing this, the optical IF rate controller 27a controls the transmission rate of the optical transmitter 22a in accordance with this rate instruction.

FIG. 7B is a flowchart illustrating the FEC setting process in the reception-side node. In the following descriptions, the FEC setting process is assumed to be performed in the optical transceiver 2b in the node B. Further, the processes of S1 to S4 and S6 in the transmission-side node and the reception-side node are substantially the same as each other, and therefore the descriptions are omitted.

When the types of the FECs used in the transmission-side node and the reception-side node are different from each other, the process of S11 is performed. In S11, the FEC controller 26b generates the rate instruction for controlling the reception rate to the default value. When this rate instruction is provided, the optical IF rate controller 27b controls the reception rate of the optical receiver 23b to the default value. On the other hand, when the types of the FECs used in the transmission-side node and the reception-side node are the same as each other, the process of S12 is performed. In S12, the FEC controller 26b generates the rate instruction for controlling the reception rate in accordance with the type of the FEC. Then the optical IF rate controller 27b controls the reception rate of the optical receiver 23b in accordance with this rate instruction.

In the above-described example, it is determined whether the types of the FECs used in the transmission-side node and the reception-side node are the same as each other based on the transmission information (the transmission rate, the modulation scheme, the number of the physical lanes, a name of the standard of the interface, the previously measured bit error rate, or the like) indicating the data transmission of the electrical interface. Note that the present invention is not limited to the above method.

For example, the transmission information may include information for directly identifying the type of the FEC. In this case, the node A reports the type of the FEC used in the node A to the node B, and the node B reports the type of the FEC used in the node B to the node A. Subsequently, the FEC controllers and the optical IF rate controllers perform the same processing as that of the above-described example.

FIG. 8 illustrates another example of the optical transmission system according to the embodiment of the present invention. In the embodiment illustrated in FIG. 3, the optical transceivers 2a and 2b respectively start up the FEC setting process. In contrast, in the embodiment illustrated in FIG. 8, the MAC devices 1a and 1b respectively start up the FEC setting process.

Accordingly, in the embodiment illustrated in FIG. 8, the MAC device 1a includes an electrical IF information providing unit 13a in addition to the transmitter 11a and the receiver 12a. The electrical IF information providing unit 13a transmits transmission information IF-1 indicating the data transmission of the electrical interface IF-1 to the optical transceiver 2a. This transmission information IF-1 is received by the electrical IF information collection unit 25a and is provided for the FEC controller 26a. In addition, this transmission information IF-1 is received by the electrical IF information collection unit 28b via the optical transmitter 22a and the optical receiver 23b, and is provided for the FEC controller 26b.

Similarly, the MAC device 1b includes an electrical IF information providing unit 13b in addition to the transmitter 11b and the receiver 12b. The electrical IF information providing unit 13b transmits transmission information IF-2 indicating the data transmission of the electrical interface IF-2 to the optical transceiver 2b. This transmission information IF-2 is received by the electrical IF information collection unit 25b and is provided for the FEC controller 26b. In addition, this transmission information IF-2 is received by the electrical IF information collection unit 28a via the optical transmitter 22b and the optical receiver 23a, and is provided for the FEC controller 26a.

As described above, also in the embodiment illustrated in FIG. 8, the FEC controller 26a in the node A and the FEC controller 26b in the node B obtain the same transmission information. The subsequent FEC setting procedures in the embodiments illustrated in FIGS. 3 and 8 are substantially the same as each other.

Figure 9:
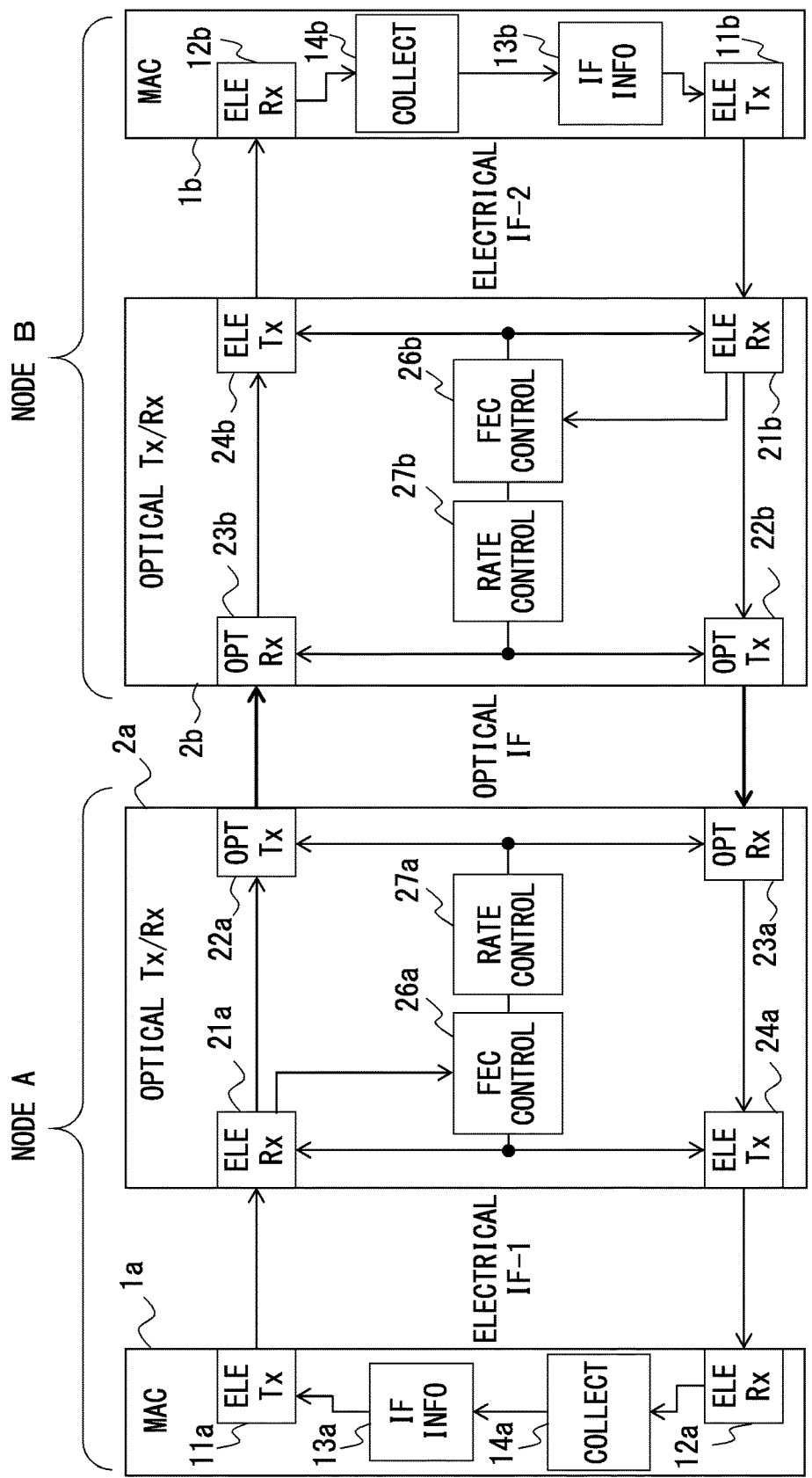
FIG. 9 illustrates still another example of the optical transmission system according to the embodiment of the present invention.

FIG. 9 illustrates still another example of the optical transmission system according to the embodiment of the present invention. In the same manner as in the embodiment illustrated in FIG. 8, also in the embodiment illustrated in FIG. 9, the MAC devices 1a and 1b respectively start up the FEC setting process. However, in the embodiment illustrated in FIG. 9, the MAC devices 1a and 1b determine whether to change the FEC setting.

Accordingly, in the embodiment illustrated in FIG. 9, the MAC device 1a includes an electrical IF information collection unit 14a in addition to the transmitter 11a, the receiver 12a, and the electrical IF information providing unit 13a. Similarly, the MAC device 1b includes an electrical IF information collection unit 14b in addition to the transmitter 11b, the receiver 12b, and the electrical IF information providing unit 13b.

In the optical transmission system illustrated in FIG. 9, transmission information IF-1 that is provided by the electrical IF information providing unit 13a is forwarded to the MAC device 1b via the optical transceivers 2a and 2b. This transmission information IF-1 is received by the electrical IF information collection unit 14b and is provided for the electrical IF information providing unit 13b. Similarly, transmission information IF-2 that is provided by the electrical IF information providing unit 13b is forwarded to the MAC device 1a via the optical transceivers 2b and 2a. This transmission information IF-2 is received by the electrical IF information collection unit 14a and is provided for the electrical IF information providing unit 13a.

Based on transmission information IF-1 managed by the electrical IF information providing unit 13a itself and transmission information IF-2 obtained from the MAC device 1b, the electrical IF information providing unit 13a determines the FEC setting in the node A. That is, the FEC setting information for indicating whether to terminate the FEC in the optical transceiver 2a is generated. This FEC setting information is provided for the FEC controller 26a via the transmitter 11a and the receiver 21a. Similarly, based on transmission information IF-2 managed by the electrical IF information providing unit 13b itself and transmission information IF-1 obtained from the MAC device 1a, the electrical IF information providing unit 13b determines the FEC setting in the node B. That is, the FEC setting information for indicating whether to terminate the FEC in the optical transceiver 2b is generated. This FEC setting information is provided for the FEC controller 26b via the transmitter 11b and the receiver 21b. The subsequent FEC setting procedures in the embodiments illustrated in FIGS. 3 and 9 are substantially the same as each other.

Subsequently, with reference to FIGS. 10-15, a sequence is described for the FEC setting performed before data communication is started. In the following descriptions, the communication is assumed to be performed between the nodes A and B illustrated in FIG. 3, 8, or 9. Each of the optical transceivers 2a and 2b is a pluggable module. When the optical transceivers 2a and 2b are connected to the MAC devices 1a and 1b, respectively, the FEC setting sequence is started. Herein, when the transmission scheme between the nodes A and B is the DMT modulation, the FEC setting sequence may be performed, for example, in a negotiation process of determining a bit allocation for sub-carriers of the DMT modulation.

Figure 10:
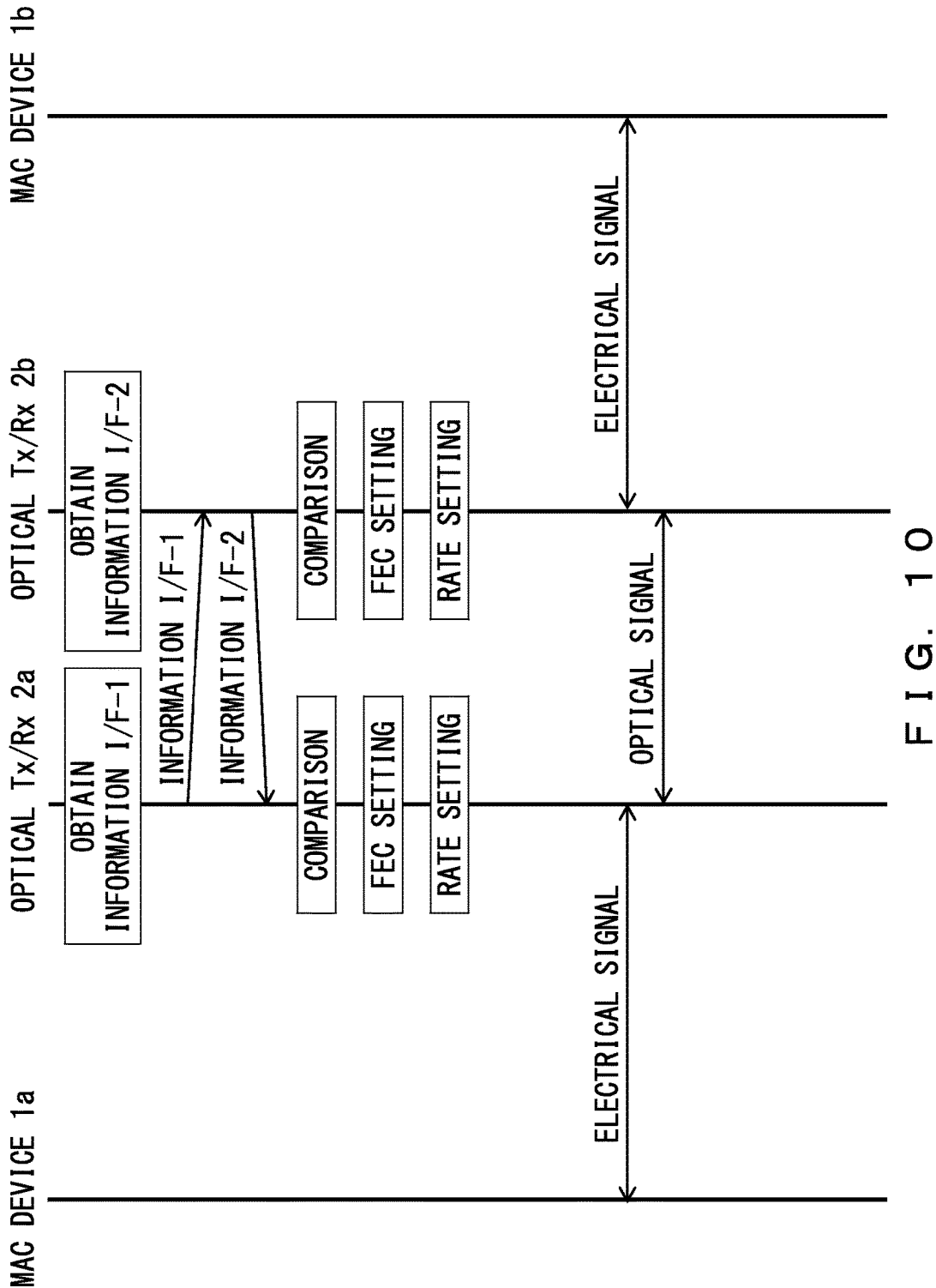

In a case illustrated in FIG. 10, the optical transceiver 2a manages transmission information IF-1 indicating the data transmission of the electrical interface IF-1, and the optical transceiver 2b manages transmission information IF-2 indicating the data transmission of the electrical interface IF-2. Accordingly, when the FEC setting sequence is started, the optical transceiver 2a obtains transmission information IF-1 and the optical transceiver 2b obtains transmission information IF-2. Then, the optical transceiver 2a transmits transmission information IF-1 to the node B, and the optical transceiver 2b transmits transmission information IF-2 to the node A.

Based on transmission information IF-1 and transmission information IF-2, the optical transceiver 2a compares the types of the FECs used in the nodes A and B. According to this comparison, it is decided whether to perform the FEC processing. Then, the optical transceiver 2a performs the FEC setting and the transmission rate setting in accordance with this decision result. Similarly, the optical transceiver 2b also performs the FEC setting and the transmission rate setting. Subsequently, the data communication is started between the nodes A and B (that is, between the MAC devices 1a and 1b).

In a case illustrated in FIG. 11, the transmission information indicating the data transmissions of the electrical interfaces within the nodes A and B is managed by the MAC devices 1a and 1b, respectively. Accordingly, when the FEC setting sequence is started, the optical transceiver 2a makes a request to the MAC device 1a for transmission information IF-1, and the optical transceiver 2b makes a request to the MAC device 1b for transmission information IF-2. When the requests are issued, the MAC device 1a provides transmission information IF-1 for the optical transceiver 2a, and the MAC device 1b provides transmission information IF-2 for the optical transceiver 2b. Subsequent procedures in FIGS. 10 and 11 are substantially the same as each other. Herein, in a sequence illustrated in FIG. 11, the optical transceiver may be connectable to the MAC device that provides a different electrical interface.

Figure 12:
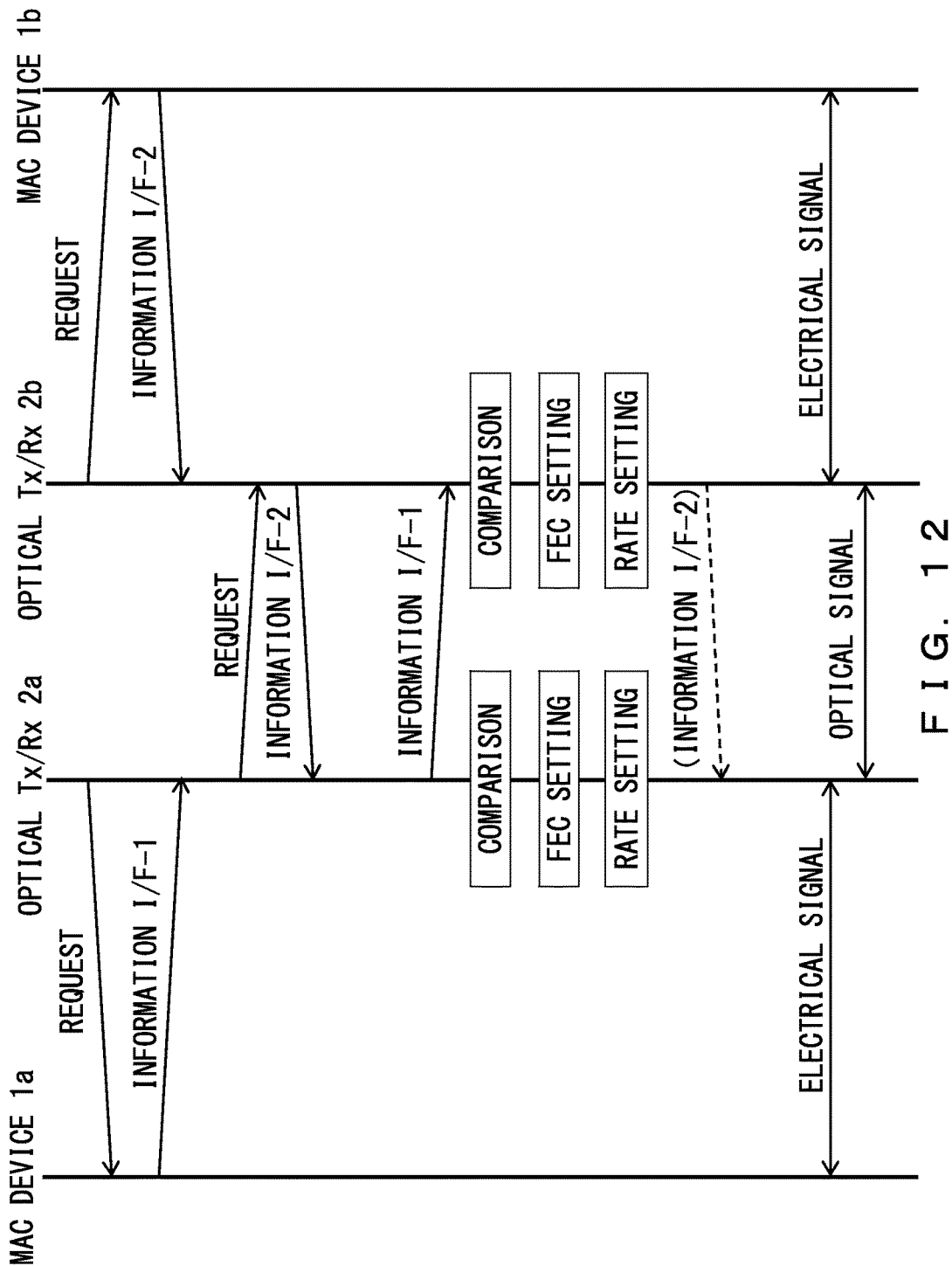

A sequence illustrated in FIG. 12 resembles the sequence illustrated in FIG. 11. However, in a case illustrated in FIG. 12, the optical transceiver 2a makes a request to the optical transceiver 2b for transmission information IF-2. When this request is issued, the optical transceiver 2b provides transmission information IF-2 for the optical transceiver 2a. Then, the optical transceiver 2a provides transmission information IF-1 for the optical transceiver 2b. Subsequent procedures in FIGS. 10 and 12 are substantially the same as each other.

After the FEC setting and the rate setting are finished, the optical transceiver 2a may provide transmission information IF-1 for the optical transceiver 2b. Further, after the FEC setting and the rate setting are finished, the optical transceiver 2b may provide transmission information IF-2 for the optical transceiver 2a again.

In a case illustrated in FIG. 13, the optical transceiver provided in one of a pair of the nodes works as a master device and controls the FEC setting sequence. In an example illustrated in FIG. 13, the optical transceiver 2a provided in the node A works as a master device. Specifically, the optical transceiver 2a obtains transmission information IF-1 from the MAC device 1a, and then makes a request to the optical transceiver 2b for transmission information IF-2. When this request is issued, the optical transceiver 2b obtains transmission information IF-2 from the MAC device 1b and provides the obtained transmission information IF-2 for the optical transceiver 2a. Subsequent procedures in FIGS. 10 and 13 are substantially the same as each other.

Figure 14:
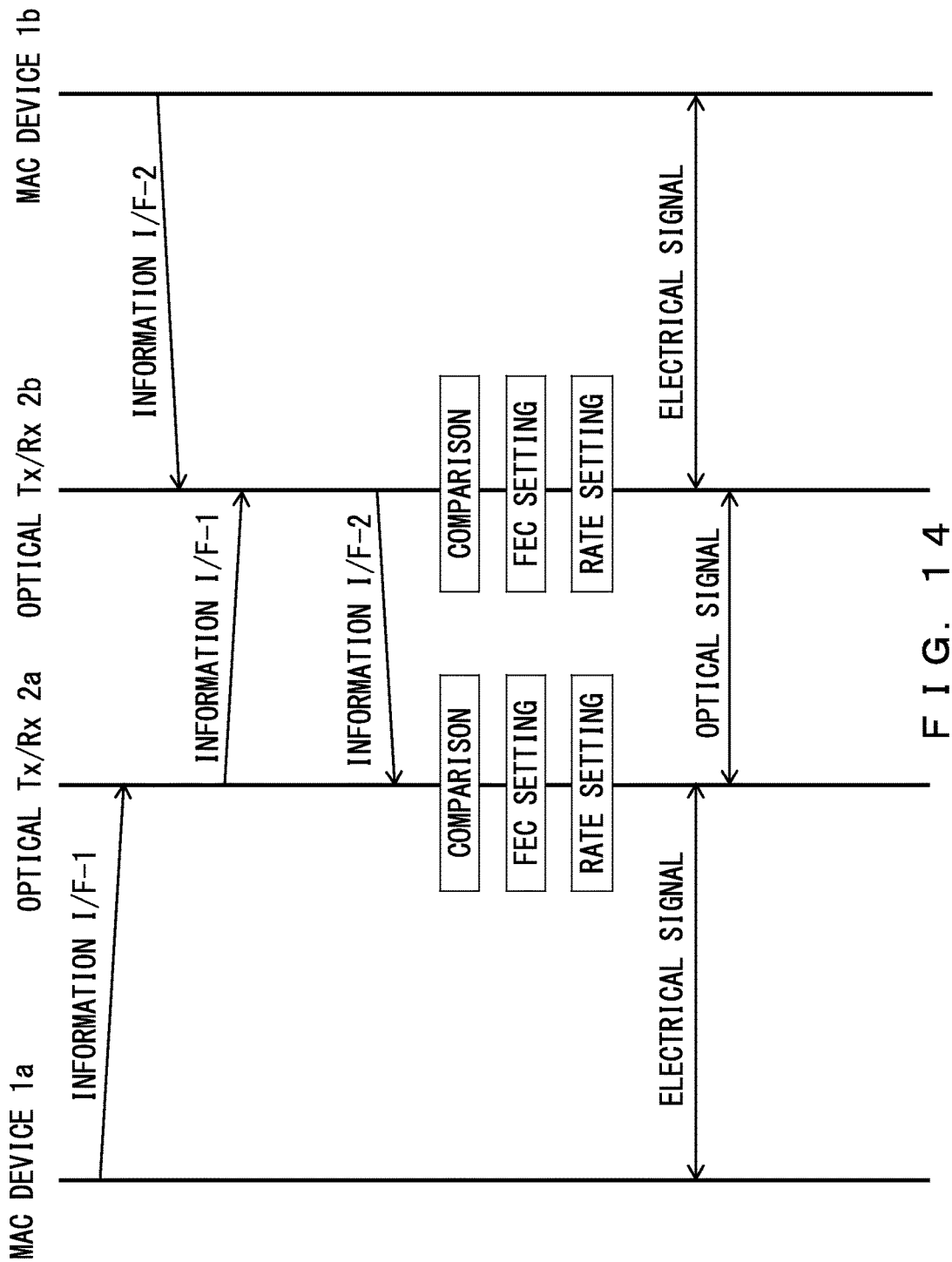

In a case illustrated in FIG. 14, when the FEC setting sequence is started, transmission information IF-1 is provided from the MAC device 1a to the optical transceiver 2a, and transmission information IF-2 is provided from the MAC device 1b to the optical transceiver 2b. Subsequent procedures in FIGS. 10 and 14 are substantially the same as each other. Herein, in a sequence illustrated in FIG. 14, the MAC device can select a desired electrical interface.

In a case illustrated in FIG. 15, the setting of each optical transceiver in each node is controlled by a network management system 50. In each node, a switch circuit is provided. The switch circuit includes a switch fabric. The switch fabric can accommodate a plurality of MAC devices. To each MAC device, the optical transceiver is connectable. Each optical transceiver is connectable to other optical transceivers through an optical fiber.

In this example, an electrical interface in each node is made common. In the node A, for example, all the electrical interfaces between MAC LSIs-A1, A2, . . . and optical transceivers A1, A2, . . . are IF-1. Similarly, all the electrical interfaces between MAC LSIs-B1, B2, . . . and optical transceivers B1, B2, . . . are IF-2.

The network management system 50 manages paths for connecting the nodes. In the example illustrated in FIG. 15, when the MAC LSI-A1 in the node A and the MAC LSI-B1 in the node B are connected to each other, a path that is established between them is registered in the network management system 50.

When a new path is registered, the network management system 50 performs the FEC setting for the path. Specifically, the network management system 50 makes a request to the nodes A and B, respectively, for the transmission information indicating the data transmissions in the electrical interface. In response to the request, the nodes A and the node B respectively transmit transmission information IF-1 and transmission information IF-2 to the network management system 50. Then, the network management system 50 detects types of the FECs used in the nodes A and B, respectively, and decides whether the types of the FECs are the same as each other. In addition, according to this decision, the network management system 50 transmits the setting information to the nodes A and B. The setting information includes information indicating whether to terminate the FEC in the optical transceiver and information indicating the transmission rate of the optical interface. As a result, the MAC LSI-A1 in the node A and the MAC LSI-B1 in the node B respectively perform setting of the circuits in accordance with the setting information provided from the network management system 50.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A transmission device that is implemented in a first node in an optical transmission system in which a frame is transmitted from the first node to a second node via an optical interface, the transmission device comprising:
   a receiver configured to receive a frame to which an error correction code is added from a frame generator via a first electrical interface;
   an optical transmitter configured to transmit the frame received by the receiver to the second node via the optical interface; and
   a decision unit configured to decide, based on first transmission information indicating a data transmission in the first electrical interface and second transmission information indicating a data transmission in a second electrical interface provided between an optical receiver that receives a frame via the optical interface and a frame termination circuit that terminates the frame received by the optical receiver in the second node, whether a type of a first error correction code used in the first electrical interface is the same as a type of a second error correction code used in the second electrical interface, wherein
   the receiver terminates an error correction code that is added to a received frame and guides the received frame from which the error correction code is removed to the optical transmitter when a type of the first error correction code is different from a type of the second error correction code, and
   the receiver guides a received frame to which an error correction code is added to the optical transmitter without terminating the error correction code when a type of the first error correction code is the same as a type of the second error correction code.

2. The transmission device according to claim 1, further comprising
   a rate controller configured to control a transmission rate for transmitting a signal via the optical interface, wherein
   the rate controller controls the optical transmitter so that the optical transmitter transmits the frame from which the error correction code is removed via the optical interface at a first rate when the type of the first error correction code is different from the type of the second error correction code, and
   the rate controller controls the optical transmitter so that the optical transmitter transmits the frame to which the error correction code is added via the optical interface at a second rate higher than the first rate when the type of the first error correction code is the same as the type of the second error correction code.

3. The transmission device according to claim 2, wherein the rate controller controls a clock frequency of the optical interface according to whether the type of the first error correction code matches the type of the second error correction code.

4. The transmission device according to claim 2, wherein
   the optical transmitter has a configuration to transmit a frame with a discrete multi-tone (DMT) modulation to the second node via the optical interface, and
   the rate controller controls a bit allocation for sub-carriers of a DMT modulated signal generated by the optical transmitter according to whether the type of the first error correction code matches the type of the second error correction code.

5. The transmission device according to claim 1, wherein the decision unit decides whether the type of the first error correction code is the same as the type of the second error correction code according to a comparison between a transmission rate of the first electrical interface and a transmission rate of the second electrical interface.

6. The transmission device according to claim 1, wherein the decision unit decides whether the type of the first error correction code is the same as the type of the second error correction code according to a comparison between a modulation scheme of the first electrical interface and a modulation scheme of the second electrical interface.

7. The transmission device according to claim 1, wherein the decision unit decides whether the type of the first error correction code is the same as the type of the second error correction code according to a comparison between the number of physical lanes of the first electrical interface and the number of physical lanes of the second electrical interface.

8. The transmission device according to claim 1, wherein the decision unit decides whether the type of the first error correction code is the same as the type of the second error correction code according to a comparison between a standard of the first electrical interface and a standard of the second electrical interface.

9. The transmission device according to claim 1, wherein the decision unit decides whether the type of the first error correction code is the same as the type of the second error correction code according to a comparison between an error rate that is measured in the first electrical interface and an error rate that is measured in the second electrical interface.

10. A transmission device that is implemented in a second node in an optical transmission system in which a frame is transmitted from a first node to the second node via an optical interface, the transmission device comprising:
    an optical receiver configured to receive a frame from the first node via the optical interface;
    a transmitter configured to transmit the frame received by the optical receiver to a frame termination circuit that terminates the frame via a second electrical interface;
    a decision unit configured to decide, based on first transmission information indicating a data transmission in a first electrical interface provided between a frame generation circuit that generates a frame and an optical transmitter that transmits the frame generated by the frame generation circuit via the optical interface in the first node and second transmission information indicating a data transmission in the second electrical interface, whether a type of a first error correction code used in the first electrical interface is the same as a type of a second error correction code used in the second electrical interface; and
    a rate controller configured to control a reception rate for receiving a signal via the optical interface, wherein when the type of the first error correction code is
different from the type of the second error correction
code,
the rate controller controls the optical receiver so that
the optical receiver receives a frame to which an
error correction code is not added via the optical
interface at a first rate, and
the transmitter adds an error correction code to a frame
received by the optical receiver and transmits the
received frame to the frame termination circuit, and
wherein when the type of the first error correction code is
the same as the type of the second error correction
code,
the rate controller controls the optical receiver so that
the optical receiver receives a frame to which an
error correction code is added via the optical interface at a second rate that is higher than the first rate,
and
the transmitter transmits the frame received by the
optical receiver to the frame termination circuit.

11. A transmission method for transmitting a frame from a first node to a second node via an optical interface, wherein a frame generation circuit that generates a frame and a first transmission device that outputs the frame generated by the frame generation circuit via the optical interface are provided in the first node, a second transmission device that receives a frame via the optical interface and a frame termination circuit that terminates the frame received by the second transmission device are provided in the second node,
wherein when a type of a first error correction code added
to a frame that is generated by the frame generation
circuit is different from a type of a second error
correction code terminated by the frame termination
circuit, the transmission method comprises:
terminating and removing the first error correction code
added to the frame in the first transmission device;
outputting the frame from which the first error correction code is removed via the optical interface;
adding the second error correction code to the frame
received via the optical interface in the second node;
and
guiding the frame to which the second error correction
code is added to the frame termination circuit, and
wherein when a type of an error correction code added to
a frame that is generated by the frame generation circuit
is the same as a type of an error correction code
terminated by the frame termination circuit, the transmission method comprises:
outputting the frame generated by the frame generation
circuit via the optical interface without terminating
the error correction code added to the frame in the
first node; and
guiding the frame received via the optical interface to
the frame termination circuit in the second node.

* * * * *